United States Patent
Wang et al.

(10) Patent No.: US 12,432,014 B2
(45) Date of Patent: Sep. 30, 2025

(54) HYBRID AUTOMATIC REPEAT REQUEST HARQ FEEDBACK INFORMATION TRANSMISSION METHOD AND APPARATUS

(71) Applicant: Huawei Technologies Co., Ltd., Shenzhen (CN)

(72) Inventors: Jun Wang, Shanghai (CN); Wenjie Peng, Shanghai (CN); Mingzeng Dai, Shenzhen (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 569 days.

(21) Appl. No.: 17/651,150

(22) Filed: Feb. 15, 2022

(65) Prior Publication Data

US 2022/0173840 A1    Jun. 2, 2022

Related U.S. Application Data

(63) Continuation of application No. PCT/CN2020/109638, filed on Aug. 17, 2020.

(30) Foreign Application Priority Data

Aug. 16, 2019    (CN) .......................... 201910760464.5

(51) Int. Cl.
*H04L 1/1812* (2023.01)
*H04L 5/00* (2006.01)
(Continued)

(52) U.S. Cl.
CPC .......... *H04L 1/1812* (2013.01); *H04L 5/0053* (2013.01); *H04W 72/0446* (2013.01);
(Continued)

(58) Field of Classification Search
None
See application file for complete search history.

(56) References Cited

U.S. PATENT DOCUMENTS

| | | |
|---|---|---|
| 2015/0341912 A1 | 11/2015 | Kim et al. |
| 2019/0058986 A1 | 2/2019 | Loehr et al. |

(Continued)

FOREIGN PATENT DOCUMENTS

| | | |
|---|---|---|
| CN | 101369874 A | 2/2009 |
| CN | 103368706 A | 10/2013 |

(Continued)

OTHER PUBLICATIONS

Author Unknown, Sidelink physical layer procedures for NR V2X, Doc. No. R1-1906008, pp. 1-23, May 17, 2019.*

(Continued)

*Primary Examiner* — Christopher M Crutchfield
(74) *Attorney, Agent, or Firm* — Slater Matsil, LLP

(57) ABSTRACT

This application provides a hybrid automatic repeat request HARQ feedback information transmission method and an apparatus, to flexibly determine a feedback manner type. The method includes: A first terminal device obtains a transmission resource, determines, based on a first correspondence, a feedback manner type corresponding to a current transmission, performs data packet assembly processing based on the feedback manner type, and sends the data packet by using the transmission resource.

18 Claims, 5 Drawing Sheets

300

A first terminal device determines, based on a first correspondence, a feedback manner type corresponding to a current transmission — S310

The first terminal device performs data packet assembly processing based on the feedback manner type — S320

The first terminal device sends a data packet by using a transmission resource — S330

(51) Int. Cl.
   *H04W 72/0446* (2023.01)
   *H04W 72/0453* (2023.01)
   *H04W 72/20* (2023.01)
   *H04W 72/56* (2023.01)

(52) U.S. Cl.
   CPC ....... *H04W 72/0453* (2013.01); *H04W 72/20* (2023.01); *H04W 72/56* (2023.01)

(56) References Cited

U.S. PATENT DOCUMENTS

| | | | |
|---|---|---|---|
| 2020/0067587 A1 | 2/2020 | Wen et al. | |
| 2020/0351032 A1* | 11/2020 | Wu | H04W 72/56 |
| 2022/0039067 A1* | 2/2022 | Lu | H04W 72/02 |
| 2022/0255680 A1* | 8/2022 | Moon | H04L 5/0055 |
| 2022/0256357 A1* | 8/2022 | Kim | H04W 72/12 |
| 2022/0295517 A1* | 9/2022 | Hahn | H04L 5/0044 |

FOREIGN PATENT DOCUMENTS

| | | |
|---|---|---|
| CN | 104335666 A | 2/2015 |
| CN | 107733558 A | 2/2018 |
| CN | 109075908 A | 12/2018 |
| CN | 201910365424 * | 4/2019 |
| JP | 2010537518 A | 12/2010 |
| WO | 2018201962 A1 | 11/2018 |

OTHER PUBLICATIONS

Author Unknown, Physical Layer Procedures for Sidelink, Doc. No. R1-197051, pp. 1-10, May 17, 2019.*

TCL Communication, "Physical Layer Procedures for Sidelink", 3GPP TSG RAN WG1 Meeting #98, R1-1908279, Aug. 26-30, 2019, 14 Pages, Prague, Czech Republic.

OPPO, Physical layer procedure for NR-V2X sidelink. 3GPP TSG RAN WG1 #97, Reno, USA, May 13-17, 2019, R1-1906475, 12 pages.

Lenovo, et al., "Discussion on physical layer procedures for NR sidelink", 3GPP TSG RAN WG1 #97, R1-1906271, May 13-17, 2019, 7 Pages, Reno, USA.

OPPO, "Left issues on MAC for NR-V2X", 3GPP TSG-RAN WG2 Meeting #106, R2-1908074, Revision of R2-1905568, May 13-17, 2019, 7 Pages, Reno, US.

VIVO, "Physical layer procedure for NR sidelink", 3GPP TSG RAN WG1 Meeting #96bis, R1-1904077, Apr. 8-12, 2019, 11 Pages, Xi'an, China.

VIVO, "Physical layer procedure for NR sidelink", 3GPP TSG RAN WG1 Meeting #97, May 13-17, 2019, 12 Pages, Reno, USA.

Xiaomi Communications, "On HARQ operation for 5G V2x communications", 3GPP TSG RAN WG1 #97, R1-1906574, May 13-17, 2019, 3 Pages, Reno, USA.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.6.0, Technical Specification, Jun. 2019, 133 Pages.

3rd Generation Partnership Project; Technical Specification Group Services and System Aspects; Enhancement of 3GPP support for V2X scenarios; Stage 1 (Release 16), 3GPP TS 22.186 V16.2.0, Technical Specification, Jun. 2019, 18 Pages.

"3rd Generation Partnership Project; Technical Specification Group Radio Access Network; NR; Radio Resource Control (RRC) protocol specification (Release 15)", GPP TS 38.331 V15.6.0, Technical Specification, Jun. 2019, 519 Pages.

"3rd Generation Partnership Project; Technical Specification Group Services and System Aspects; Study on enhancement of 3GPP Support for 5G V2X Services (Release 16)", 3GPP TR 22.886 V16.2.0, Technical Report, Dec. 2018, 76 Pages.

"3rd Generation Partnership Project; Technical Specification Group Radio Access Network; NR; Medium Access Control (MAC) protocol specification (Release 15)", 3GPP TS 38.321 V15.6.0, Technical Specification, Jun. 2019, 78 Pages.

Huawei, et al., "Discussion on HARQ feedback enable and disable", 3GPP TSG-RAN WG2 #106, R2-1907416, May 13-17, 2019, 5 Pages, Reno, USA.

LG Electronics [RAN1], "[Draft] LS on sidelink HARQ feedback for groupcast", 3GPP TSG RAN WG1 Meeting #96bis, R1-1905790, Apr. 8-12, 2019, 2 Pages, Xi'an, China.

LG Electronics, "Feature lead summary for agenda item 7.2.4.5 Physical layer procedures for sidelink", 3GPP TSG RAN WG1 #96bis, R1-1905624, Apr. 8-12, 2019, 22 Pages, Xi'an, China.

Nokia, et al., "Discussion of physical layer procedures for sidelink", 3GPP TSG-RAN WG1 Meeting #97, R1-1906079, May 13-17, 2019, 9 Pages, Reno, USA.

Qualcomm Incorporated, "Physical layer procedures for sidelink", 3GPP TSG RAN WG1 Meeting #97, R1-1907274, May 13-17, 2019, 16 Pages, Reno, USA.

RAN1, "LS on sidelink HARQ feedback for groupcast", 3GPP TSG RAN WG1 Meeting #96bis, R1-1905906, Apr. 8-12, 2019, 2 Pages, Xi'an, China.

Samsung, "Sidelink HARQ Configuration", 3GPP TSG-RAN WG2 Meeting #105bis, R2-1904805, Apr. 8-12, 2019, 2 Pages, Xi'an, China.

TCL Communication, "Physical Layer Procedures for Sidelink", 3GPP TSG RAN WG1 Meeting #97, R1-1907051, May 12, 2019, 10 Pages, Reno, U.S.

Samsung, Sidelink HARQ Configuration, 3GPP TSG-RAN WG2 Meeting #106 Reno, USA, May 13-May 17, 2019, R2-1907818, total 2 pages.

Lenovo, Motorola Mobility, SL HARQ operation, 3GPP TSG RAN WG2 Meeting #107 Prague, Czech Republic, Aug. 26-30, 2019, R2-1910086, total 4 pages.

Ericsson, On support of HARQ procedure over sidelink, 3GPP TSG-RAN WG2 #107 Prague, Czech, Aug. 26-30, 2019, TDoc R2-1910296, total 6 pages.

Lenovo, Motorola Mobility, HARQ feedback impact on RAN2, 3GPP Tsg Ran WG2 #107, Prague, Czech Republic, Aug. 26-30, 2019, R2-1910411, total 4 pages.

3GPP TSG RAN WG1 #96b R1-195405:"On Physical Layer Procedures for NR V2X Sidelink", InterDigital Inc., Apr. 12, 2019, total 9 pages.

* cited by examiner

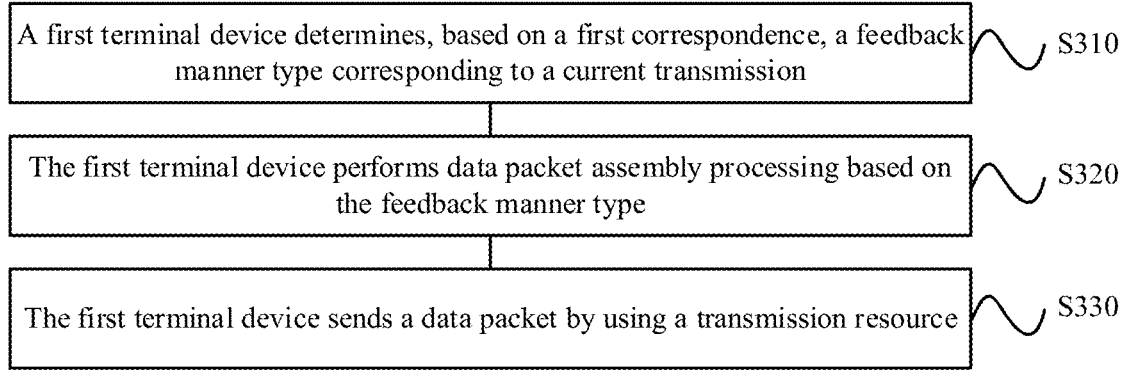
FIG. 3
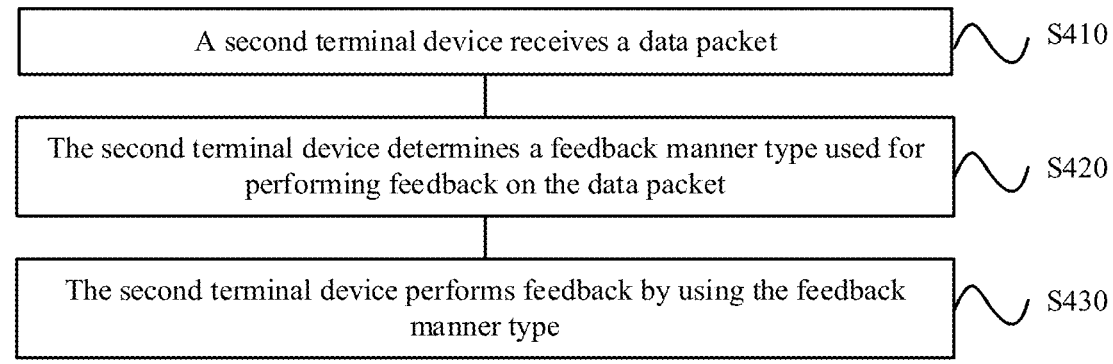
FIG. 4
| ID=1 | ID=2 | ID=3 | ID=4 |
| ID=5 | ID=6 | ID=7 | ID=8 |
| ID=9 | ID=10 | ID=11 | ID=12 |
| ID=13 | ID=14 | ID=15 | ID=16 |
FIG. 5

HYBRID AUTOMATIC REPEAT REQUEST HARQ FEEDBACK INFORMATION TRANSMISSION METHOD AND APPARATUS

CROSS-REFERENCE TO RELATED APPLICATIONS

This application is a continuation of International Application No. PCT/CN 2020/109638, filed on Aug. 17, 2020, which claims priority to Chinese Patent Application No. 201910760464.5, filed on Aug. 16, 2019. The disclosures of the aforementioned applications are hereby incorporated by reference in their entireties.

TECHNICAL FIELD

This application relates to the communication field, and more specifically, to a hybrid automatic repeat request (HARQ) feedback information transmission method and an apparatus.

BACKGROUND

Vehicle to everything (V2X) is considered as one of the most promising fields with clearest market requirements in the internet of things system. V2X features large application space, great industry potential, and strong social benefits, and is of great significance to promote the innovation and development of the automobile and information communication industry, build new models and new forms of automobile and transportation services, promote the innovation and application of autonomous driving technologies, and improve transportation efficiency and safety. V2X provides vehicle information by using sensors installed on vehicles, vehicle-mounted terminals, or the like, and implements vehicle-to-vehicle communication, vehicle-to-pedestrian communication, vehicle-to-road-side-infrastructure communication, and vehicle-to-network communication through various communication technologies.

One unicast transmission over a sidelink is used as an example. Transmit-end user equipment (UE) needs to perform sending to receive-end UE. After receiving corresponding data, the receive-end UE feeds back, depending on whether demodulation succeeds, whether this transmission succeeds to the Tx UE. For example, if this reception succeeds, the receive-end UE feeds back an acknowledgement (ACK); otherwise, the receive-end UE feeds back a negative acknowledgement (NACK) or does not send a feedback. In this case, if receiving the ACK, the transmit-end UE considers that the reception succeeds; or if receiving the NACK or does not receive the feedback, the transmit-end UE considers that the reception fails. The transmit-end UE determines, based on a HARQ feedback of Rx, whether the reception by the receive-end UE succeeds. If the reception is considered as a failure, a retransmission is required. If the reception is considered as a success, this transmission is considered as a success, and this transmission is stopped and/or a next transmission is performed.

Currently, there are already two feedback manners for NR SL groupcast: a manner (1) of HARQ NACK only, where to be specific, only a NACK message is fed back; and a manner (2) of HARQ ACK/NACK, where to be specific, an ACK message or a NACK message is fed back. The two approaches have respective advantages and disadvantages. In an existing technology, a feedback manner to be used cannot be dynamically configured, and this is not flexible enough.

SUMMARY

In view of this, this application provides a hybrid automatic repeat request HARQ feedback information transmission method and an apparatus, to help flexibly configure a HARQ feedback manner.

According to a first aspect, a hybrid automatic repeat request HARQ feedback information transmission method is provided, including:

A first terminal device determines, based on a first correspondence, a feedback manner type corresponding to a current transmission. The first terminal device performs data packet assembly processing based on the feedback manner type. The first terminal device sends a data packet by using a transmission resource. Therefore, the first terminal device determines the feedback manner type by using the first correspondence, and performs data packet assembly processing based on the feedback manner type, so that a HARQ feedback manner can be flexibly configured.

Optionally, the first terminal device indicates a single feedback manner type to a second terminal device by using sidelink control information SCI. For example, the first terminal device is transmit-end UE, and the second terminal device is receive-end UE. Herein, the transmit-end UE may send the SCI to the receive-end UE, to indicate the single feedback manner type.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

Optionally, the feedback manner type includes a first HARQ feedback manner, a second HARQ feedback manner, or HARQ enabled/disabled information, where the first HARQ feedback manner means that a terminal device feeds back an acknowledgement message or a non-acknowledgement message, and the second HARQ feedback manner means that a terminal device feeds back only a non-acknowledgement message. The HARQ enabled/disabled information is used to indicate whether a terminal device performs feedback. The HARQ enabled/disabled information includes HARQ enabled or HARQ disabled. Herein, if the feedback manner type is the HARQ enabled/disabled information that is HARQ enabled (enabled), the feedback manner type may further include a HARQ feedback manner, for example, the first HARQ feedback manner or the second HARQ feedback manner. If the feedback manner type is the HARQ enabled/disabled information that is HARQ disabled (disabled), the feedback manner type may not include a HARQ feedback manner, for example, the first HARQ feedback manner or the second HARQ feedback manner.

The transmission resource may carry property information or may not carry property information.

In a possible implementation, the transmission resource carries property information, and the property information is used to indicate a HARQ feedback manner supported by the transmission resource. The method further includes: The first terminal device sifts out, from the first correspondence based on the property information, at least one logical channel whose HARQ feedback manner is the same as the HARQ feedback manner supported by the transmission resource. The first terminal device sends, on the transmission resource, data that is in the at least one logical channel. Herein, if the transmission resource carries property information, the first terminal device may perform a subsequent filtering operation based on the property information.

In a possible implementation, the method further includes: If the transmission resource does not carry property information, the first terminal device performs transmission, on the transmission resource, of data in a plurality of logical channels, where a feedback manner corresponding to each of the plurality of logical channels is the same or different. Herein, if the transmission resource does not carry property information, the terminal device may multiplex logical channels together.

In a possible implementation, the method further includes: If the transmission resource does not carry property information, the first terminal device determines, for the transmission resource, a HARQ feedback manner supported by the transmission resource. The first terminal device sifts out, from the first correspondence, at least one logical channel whose HARQ feedback manner is the same as the HARQ feedback manner supported by the transmission resource. The first terminal device sends, on the transmission resource, data that is in the at least one logical channel. Herein, the first terminal device may determine the property information for the transmission resource that does not carry the property information.

Optionally, that the first terminal device determines, for the transmission resource, a HARQ feedback manner supported by the transmission resource includes: The terminal device obtains a destination address identifier with a highest priority, and uses a HARQ feedback manner corresponding to the destination address identifier, as the HARQ feedback manner supported by the transmission resource.

In a possible implementation, the method further includes: The first terminal device sends second information to the second terminal device, where the second information is used by the second terminal device to determine the feedback manner type. Optionally, the second information may be obtained by the first terminal device by receiving first information of a network device. The first terminal device may process the first information to obtain the second information. Alternatively, the first terminal device may perform no processing, that is, the second information is the same as the first information. This is not limited.

Optionally, that the first terminal device sends second information to the second terminal device includes: The first terminal device sends the second information to the second terminal device by using one or more of the following: sidelink control information SCI, MAC signaling, sidelink signaling, RRC signaling, or SIB information. For example, the first terminal device sends a plurality of feedback manner types by using RRC signaling, and indicates one of the plurality of feedback manner types by using MAC signaling.

Optionally, the second information includes one or more of the following information: a destination address identifier, a source identifier, a service type, a service identifier, a communication type, a logical channel identifier, a sidelink radio bearer, quality of service information, a transmission resource, a HARQ process identifier, a logical channel group identifier, or a transmit-end user equipment UE identifier.

Optionally, the second information indicates the feedback manner type of the single transmission.

Optionally, that the first terminal device sends second information to the second terminal device includes: The first terminal device sends a feedback manner type of a plurality of transmissions to the second terminal device, where the feedback manner type of the plurality of transmissions is included in the second information.

Optionally, the method further includes: The first terminal device sends third information to the second terminal device, where the third information includes one or more of the following information: a communication type, a range threshold, or a manner of calculating a range between the first terminal device and the second terminal device. In this way, the second terminal device can calculate the range between the first terminal device and the second terminal device.

Optionally, before that the first terminal device sends third information to the second terminal device, the method further includes: A first terminal device receives fourth information sent by a network device, where the fourth information includes: a communication type, a range threshold, or a manner of calculating a range between the first terminal device and a second terminal device. Herein, the first terminal device may receive the fourth information sent by the network device.

Optionally, when the first terminal device determines that the feedback manner type is the second HARQ feedback manner, the method further includes: The first terminal device sends information about the first terminal device to the second terminal device or the network device, where the information about the first terminal device includes: location information of the first terminal device, an identifier of a zone in which the first terminal device is located, and power information of the first terminal device. In this way, the first terminal device may notify the second terminal device of the information related to the first terminal device, so that the second terminal device calculates the range.

Optionally, the method further includes: The first terminal device obtains the first correspondence. Optionally, the first correspondence may be predefined, or may be sent by another device to the first terminal device. This is not limited.

Optionally, that the first terminal device obtains the first correspondence includes: The first terminal device receives the first correspondence sent by a network device or a terminal device. The network device may be a base station or a core network control function.

Optionally, the method further includes: The first terminal device receives a feedback policy sent by the network device, where the feedback policy is a policy used to determine a feedback manner type. That a first terminal device determines, based on a first correspondence, a feedback manner type corresponding to a current transmission includes: The first terminal device determines, based on the first correspondence by using the feedback policy, the feedback manner type corresponding to the current transmission. Herein, the feedback policy may be an explicit feedback policy, that is, a feedback manner type is directly indicated. Alternatively, the feedback policy means that the terminal device needs to determine, according to the feedback policy and with reference to a status of the terminal device, a feedback manner type to be used. Optionally, the feedback policy may alternatively be HARQ enabled/disabled information.

In a possible implementation, that the first terminal device determines, based on the first correspondence by using the feedback policy, the feedback manner type corresponding to the current transmission includes: The first terminal device determines, by using the feedback policy and based on the first correspondence and a status of the first terminal device, the feedback manner type corresponding to the current transmission. The status of the first terminal device may be information such as a number of group members, load, and a service delay.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

According to a second aspect, a hybrid automatic repeat request HARQ feedback information transmission method is provided, including: A second terminal device receives a data packet. The second terminal device determines a feedback manner type used for performing feedback on the data packet. The second terminal device performs feedback by using the feedback manner type. Therefore, the second terminal device can flexibly determine the feedback manner type, and perform corresponding feedback.

Optionally, the second terminal device receives a feedback manner type that is of a single transmission and that is sent by a first terminal device by using SCI.

Optionally, the feedback manner type includes a first HARQ feedback manner, a second HARQ feedback manner, or HARQ enabled/disabled information, where the first HARQ feedback manner means that a terminal device feeds back an acknowledgement message or a non-acknowledgement message, and the second HARQ feedback manner means that a terminal device feeds back only a non-acknowledgement message. The HARQ enabled/disabled information is used to indicate whether a terminal device performs feedback. The HARQ enabled/disabled information includes HARQ enabled or HARQ disabled. Herein, if the feedback manner type is the HARQ enabled/disabled information that is HARQ enabled, the feedback manner type may further include a HARQ feedback manner, for example, the first HARQ feedback manner or the second HARQ feedback manner. If the feedback manner type is the HARQ enabled/disabled information that is HARQ disabled, the feedback manner type may not include a HARQ feedback manner, for example, the first HARQ feedback manner or the second HARQ feedback manner.

In a possible implementation, the method further includes: The second terminal device obtains a first correspondence.

Optionally, that the second terminal device obtains a first correspondence includes: The second terminal device receives the first correspondence sent by a network device or a first terminal device. Optionally, the first correspondence may be notified by another terminal device to the second terminal device, or may be generated by the second terminal device. This is not limited.

Optionally, the first correspondence includes a correspondence between a first granularity and a HARQ feedback manner, and the first granularity includes one or more of the following: a destination address identifier, a source address identifier, a service type, a service identifier, a transmission type, a logical channel identifier, a sidelink radio bearer, quality of service information, a transmission resource, a HARQ process identifier, a logical channel group identifier, or a transmit-end user equipment UE identifier.

In a possible implementation, the method further includes: The second terminal device receives second information sent by the first terminal device, where the second information is used to determine the feedback manner type. That the second terminal device determines a feedback manner type used for performing feedback on the data packet includes: The second terminal device determines, based on the second information, a feedback manner type corresponding to a current transmission. Herein, the second terminal device may determine, based on the second information, the feedback manner type corresponding to the current transmission.

Optionally, that the second terminal device receives second information sent by the first terminal device includes: The second terminal device receives the second information sent by the first terminal device by using one or more of the following: sidelink control information SCI, media access control MAC signaling, sidelink signaling, radio resource control RRC signaling, or system information block SIB information.

Optionally, the second information includes one or more of the following information: a destination address identifier, a source identifier, a service type, a service identifier, a communication type, a logical channel identifier, a sidelink radio bearer, quality of service information, a transmission resource, a HARQ process identifier, a logical channel group identifier, or a transmit-end user equipment UE identifier.

Optionally, the second information indicates the feedback manner type of the single transmission.

Optionally, that the second terminal device receives second information sent by the first terminal device includes: The second terminal device receives a feedback manner type of a plurality of transmissions that is sent by the first terminal device, where the feedback manner type of the plurality of transmissions is included in the second information. That the second terminal device determines, based on the second information, a feedback manner type used for performing feedback on the data packet includes: The second terminal device determines, based on the second information and the first correspondence, the feedback manner type corresponding to the current transmission.

In a possible implementation, the method further includes: The second terminal device receives first information sent by a network device, where the first information is used to determine a feedback manner type. That the second terminal device determines a feedback manner type used for performing feedback on the data packet includes: The second terminal device determines, based on the first information, the feedback manner type corresponding to the current transmission. Herein, the second terminal device may directly receive the first information sent by the network device, to determine the feedback manner type based on the first information.

Optionally, that the second terminal device receives first information sent by a network device includes: The second terminal device receives the first information sent by the network device by using one or more of the following: downlink control information DCI, radio resource control RRC signaling, or system information block SIB information.

Optionally, the first information indicates the feedback manner type of the single transmission.

Optionally, that the second terminal device receives first information sent by a network device includes: The second terminal device receives a feedback manner type of a plurality of transmissions that is sent by the network device, where the feedback manner type of the plurality of transmissions is included in the first information. That the second terminal device determines, based on the first information, a feedback manner type used for performing feedback on the data packet includes: The second terminal device determines, based on the first information and the first correspondence, the feedback manner type corresponding to the current transmission.

Optionally, that the second terminal device performs feedback by using the feedback manner type includes: When the feedback manner type is the first HARQ feedback manner, the second terminal device sends an acknowledgement message or a non-acknowledgement message for the data packet; or when the feedback manner type is the second HARQ feedback manner, the second terminal device feeds back only a non-acknowledgement message for the data packet; or when the feedback manner type is the HARQ enabled/disabled information, if the HARQ enabled/disabled information indicates a terminal device to perform feedback, the second terminal device performs feedback for the data packet; or when the feedback manner type is the HARQ enabled/disabled information, if the HARQ enabled/disabled information indicates a terminal device to skip performing feedback, the second terminal device skips performing feedback for the data packet. Herein, if the feedback manner type is the HARQ enabled/disabled information that is HARQ enabled, the feedback manner type may further include a HARQ feedback manner, for example, the first HARQ feedback manner or the second HARQ feedback manner. If the feedback manner type is the HARQ enabled/disabled information that is HARQ disabled, the feedback manner type may not include a HARQ feedback manner, for example, the first HARQ feedback manner or the second HARQ feedback manner.

In a possible implementation, if the feedback manner type is the second HARQ feedback manner, the method further includes: The second terminal device determines a range between the first terminal device and the second terminal device. When the range meets a range threshold, the second terminal device determines that a non-acknowledgement message needs to be sent. Herein, the second terminal device may calculate the range, and send the non-acknowledgement message only when the range meets the range threshold. For example, the range between the first terminal device and the second terminal device is less than the range threshold.

Optionally, before that the second terminal device determines the range, the method further includes: The second terminal device receives third information sent from the first terminal device, where the third information includes one or more of the following information: a communication type, the range threshold, or a manner of calculating the range between the first terminal device and the second terminal device. Alternatively, the second terminal device receives fourth information from the network device, where the fourth information includes one or more of the following information: a communication type, the range threshold, or a manner of calculating the range between the first terminal device and the second terminal device. Herein, the second terminal device may receive the third information from the first terminal device or the fourth information from the network device, to calculate the range.

Optionally, that the second terminal device determines a range between the first terminal device and the second terminal device includes:

The second terminal device calculates the range based on one or more of the following information: a zone identifier, location information of the first terminal device, power information of the first terminal device, an identifier of the network device, an identifier of a zone in which the first terminal device is located, or location information of the second terminal device.

Optionally, the method further includes: The second terminal device receives information about the first terminal device, where the information about the first terminal device includes one or more of the following information: the location information of the first terminal device, the identifier of the zone in which the first terminal device is located, or the power information of the first terminal device.

Optionally, the method further includes: The second terminal device receives a feedback policy sent by the network device, where the feedback policy is a policy used to determine a feedback manner type. That the second terminal device determines a feedback manner type used for performing feedback on the data packet includes: The second terminal device determines, by using the feedback policy, the feedback manner type used for performing feedback on the data packet.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

According to a third aspect, a hybrid automatic repeat request HARQ feedback information transmission method is provided, including: A network device generates first information, where the first information is used by a terminal device to determine a feedback manner type. The network device sends the first information to a first terminal device or a second terminal device. Herein, the network device may dynamically configure the feedback manner type for the terminal device.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

In a possible implementation, that the network device sends the first information to a first terminal device or a second terminal device includes: The network device sends the first information to the first terminal device or the second terminal device by using one or more of the following: radio resource control RRC signaling, system information block SIB information, downlink control information DCI, or pre-configured signaling. Herein, the network device may indicate the feedback manner type by using one piece of information or signaling; or may configure a plurality of feedback manner types by using one piece of information or signaling, and then indicate the feedback manner type by using another piece of information or signaling, for example, perform configuration by using RRC and perform indication by using the DCI. Optionally, the network device may be a core network control function or a base station.

Optionally, the first information indicates a feedback manner type of a single transmission.

Optionally, the first information includes a feedback manner type of a plurality of transmissions.

Optionally, the first information includes a first correspondence. Optionally, the first information may include a first granularity and a HARQ feedback manner, and there is a correspondence between the first granularity and the HARQ feedback manner.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

Optionally, the method further includes: The network device sends fourth information to the first terminal device or the second terminal device, where the fourth information includes one or more of the following: a communication type, a range threshold, or a manner of calculating a range between the first terminal device and the second terminal device.

Optionally, the method further includes: The network device sends a feedback policy to the first terminal device or the second terminal device, where the feedback policy is a policy used to determine a feedback manner type.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

According to a fourth aspect, a hybrid automatic repeat request HARQ feedback information transmission method is provided, including:

A first terminal device receives first information from a network device, where the first information is used by the terminal device to determine a feedback manner type. The first terminal device applies the first information. Herein, the first terminal device may receive the first information sent by the network device, to determine the feedback manner type.

Optionally, the feedback manner type includes a first HARQ feedback manner, a second HARQ feedback manner, or HARQ enabled/disabled information, where the first HARQ feedback manner means that a terminal device feeds back an acknowledgement message or a non-acknowledgement message, and the second HARQ feedback manner means that a terminal device feeds back only a non-acknowledgement message. The HARQ enabled/disabled information includes HARQ enabled or HARQ disabled. Herein, if the feedback manner type is the HARQ enabled/disabled information that is HARQ enabled, the feedback manner type may further include a HARQ feedback manner, for example, the first HARQ feedback manner or the second HARQ feedback manner. If the feedback manner type is the HARQ enabled/disabled information that is HARQ disabled, the feedback manner type may not include a HARQ feedback manner, for example, the first HARQ feedback manner or the second HARQ feedback manner.

In a possible implementation, that the first terminal device applies the first information includes: When sending a data packet, the first terminal device determines the feedback manner type based on the first information.

In a possible implementation, that the first terminal device applies the first information includes: If a transmission resource carries the first information, and the first information indicates the feedback manner type, the first terminal device obtains a feedback manner type of this transmission based on the first information.

Optionally, that a first terminal device receives first information from a network device includes: The first terminal device receives the first information sent by the network device by using one or more of the following: radio resource control RRC signaling, or system information block SIB information, downlink control information DCI, or pre-configured signaling.

Optionally, the first information indicates a feedback manner type of a single transmission.

Optionally, the first information includes a feedback manner type of a plurality of transmissions.

Optionally, the first information includes a first correspondence. Optionally, the first information may include a first granularity and a HARQ feedback manner, and there is a correspondence between the first granularity and the HARQ feedback manner.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

In a possible implementation, the method further includes: The first terminal device generates second information based on the first information, where the second information is used by a second terminal device to determine the feedback manner type.

The first terminal device sends the second information to the second terminal device.

Optionally, that the first terminal device sends the second information to the second terminal device includes: The first terminal device sends the second information to the second terminal device by using any one of the following: sidelink control information SCI, media access control MAC signaling, sidelink signaling, radio resource control RRC signaling, or system information block SIB information.

Optionally, the second information indicates the feedback manner type of the single transmission.

Optionally, that the first terminal device sends the second information to the second terminal device includes: The first terminal device sends a feedback manner type of a plurality of transmissions to the second terminal device, where the feedback manner type of the plurality of transmissions is included in the second information.

In a possible implementation, the method further includes: The first terminal device receives fourth information from the network device, where the fourth information includes one or more of the following: a communication type, the range threshold, or a manner of calculating a range between the first terminal device and the second terminal device.

Optionally, the method further includes: The first terminal device sends third information to the second terminal device, where the third information includes one or more of the following: a communication type, a range threshold, or a manner of calculating a range between the first terminal device and the second terminal device.

According to a fifth aspect, a hybrid automatic repeat request HARQ feedback information transmission method is provided, including:

A second terminal device receives first information from a network device, where the first information is used by the terminal device to determine a feedback manner type, and determines the feedback manner type by applying the first information; or the second terminal device receives second information from a first terminal device, where the second information is used by the second terminal device to determine the feedback manner type, and applies the second information.

In a possible implementation, that the second terminal device applies the first information includes:

When sending a data packet, the second terminal device determines the feedback manner type based on the first information.

Alternatively, if a transmission resource carries the first information, and the first information indicates the feedback manner type, the second terminal device obtains a feedback manner type of this transmission based on the first information.

In a possible implementation, that the second terminal device applies the second information includes:

When sending a data packet, the second terminal device determines the feedback manner type based on the second information.

Alternatively, if a transmission resource carries the second information, and the second information indicates the feedback manner type, the second terminal device obtains a feedback manner type of this transmission based on the second information.

Optionally, the feedback manner type includes a first HARQ feedback manner, a second HARQ feedback manner, or HARQ enabled/disabled information, where the first HARQ feedback manner means that a terminal device feeds back an acknowledgement message or a non-acknowledgement message, and the second HARQ feedback manner means that a terminal device feeds back only a non-acknowledgement message. The HARQ enabled/disabled information includes HARQ enabled or HARQ disabled. Herein, if the feedback manner type is the HARQ enabled/disabled information that is HARQ enabled, the feedback manner type may further include a HARQ feedback manner, for example, the first HARQ feedback manner or the second HARQ feedback manner. If the feedback manner type is the HARQ enabled/disabled information that is HARQ disabled, the feedback manner type may not include a HARQ feedback manner, for example, the first HARQ feedback manner or the second HARQ feedback manner.

Optionally, that a second terminal device receives first information from a network device includes:

The second terminal device receives the first information sent by the network device by using one or more of the following: radio resource control RRC signaling, or system information block SIB information, downlink control information DCI, or pre-configured signaling.

Optionally, the first information indicates a feedback manner type of a single transmission.

Optionally, the first information includes a feedback manner type of a plurality of transmissions.

Optionally, the first information includes a first correspondence. Optionally, the first information may include a first granularity and a HARQ feedback manner, and there is a correspondence between the first granularity and the HARQ feedback manner.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, or a transmit-end user equipment UE identifier.

Optionally, that the second terminal device receives second information from a first terminal device includes: The second terminal device receives the second information sent by the first terminal device by using any one of the following: sidelink control information SCI, media access control MAC signaling, radio resource control RRC signaling, or system information block SIB information.

Optionally, the second information indicates the feedback manner type of the single transmission.

Optionally, that the second terminal device receives second information from a first terminal device includes: The second terminal device receives a feedback manner type of a plurality of transmissions from the first terminal device, where the feedback manner type of the plurality of transmissions is included in the second information.

According to a sixth aspect, a communication apparatus is provided. The communication apparatus includes modules configured to perform the method in any one of the first aspect or the possible implementations of the first aspect; or includes modules configured to perform the method in any one of the second aspect or the possible implementations of the second aspect; or includes modules configured to perform the method in any one of the third aspect or the possible implementations of the third aspect; or includes modules configured to perform the method in any one of the fourth aspect or the possible implementations of the fourth aspect; or includes modules configured to perform the method in any one of the fifth aspect or the possible implementations of the fifth aspect.

According to a seventh aspect, a communication apparatus is provided, including a processor and an interface circuit. The interface circuit is configured to: receive a signal from another communication apparatus other than the communication apparatus and transmit the signal to the processor, or send, to another communication apparatus other than the communication apparatus, a signal from the processor. The processor uses a logical circuit or executes code instructions to implement the method in any one of the first aspect or the possible implementations of the first aspect, or to implement the method in any one of the fourth aspect or the possible implementations of the fourth aspect.

According to an eighth aspect, a communication apparatus is provided, including a processor and an interface circuit. The interface circuit is configured to: receive a signal from another communication apparatus other than the communication apparatus and transmit the signal to the processor, or send, to another communication apparatus other than the communication apparatus, a signal from the processor. The processor uses a logical circuit or executes code instructions to implement the method in any one of the second aspect or the possible implementations of the second aspect, or to implement the method in any one of the fifth aspect or the possible implementations of the fifth aspect.

[owl] According to a ninth aspect, a communication apparatus is provided, including a processor and an interface circuit. The interface circuit is configured to: receive a signal from another communication apparatus other than the communication apparatus and transmit the signal to the processor, or send, to another communication apparatus other than the communication apparatus, a signal from the processor. The processor uses a logical circuit or executes code instructions to implement the method in any one of the third aspect or the possible implementations of the third aspect.

According to a tenth aspect, a computer-readable storage medium is provided. The computer-readable storage medium stores a computer program or instructions. When the computer program or the instructions are executed, the method in any one of the first aspect or the possible implementations of the first aspect is implemented, or the method in any one of the fourth aspect or the possible implementations of the fourth aspect is implemented.

According to an eleventh aspect, a computer-readable storage medium is provided. The computer-readable storage medium stores a computer program or instructions. When the computer program or the instructions are executed, the method in any one of the second aspect or the possible implementations of the second aspect is implemented, or the method in any one of the fifth aspect or the possible implementations of the fifth aspect is implemented.

According to a twelfth aspect, a computer-readable storage medium is provided. The computer-readable storage medium stores a computer program or instructions. When the computer program or the instructions are executed, the method in any one of the third aspect or the possible implementations of the third aspect is implemented.

According to a thirteenth aspect, a computer program product including instructions is provided. When the instructions are run, the method in any one of the first aspect or the possible implementations of the first aspect is implemented, or the method in any one of the second aspect or the possible implementations of the second aspect is implemented, or the method in any one of the third aspect or the possible implementations of the third aspect is implemented, or the method in any one of the fourth aspect or the possible implementations of the fourth aspect is implemented, or the method in any one of the fifth aspect or the possible implementations of the fifth aspect is implemented.

According to a fourteenth aspect, a communication chip is provided, storing instructions. When the instructions are run on a computer device, the communication chip is enabled to perform the method in any one of the first aspect or the possible implementations of the first aspect, or perform the method in any one of the fourth aspect or the possible implementations of the fourth aspect.

According to a fifteenth aspect, a communication chip is provided, storing instructions. When the instructions are run on a computer device, the communication chip is enabled to perform the method in any one of the second aspect or the possible implementations of the second aspect, or perform the method in any one of the fifth aspect or the possible implementations of the fifth aspect.

According to a sixteenth aspect, a communication chip is provided, storing instructions. When the instructions are run on a computer device, the communication chip is enabled to perform the method in any one of the third aspect or the possible implementations of the third aspect.

According to a seventeenth aspect, a communication system is provided. The communication system includes one or more of the following communication apparatuses: the communication apparatus in the fourth aspect, the communication apparatus in the fifth aspect, and the communication apparatus in the sixth aspect.

BRIEF DESCRIPTION OF THE DRAWINGS

FIG. 3 is a schematic flowchart of a HARQ feedback information transmission method according to an embodiment of this application;

FIG. 4 is a schematic flowchart of a HARQ feedback information transmission method according to another embodiment of this application;

FIG. 5 is an example diagram of assignment of zone identifiers;

DETAILED DESCRIPTION OF ILLUSTRATIVE EMBODIMENTS

Figure 1:
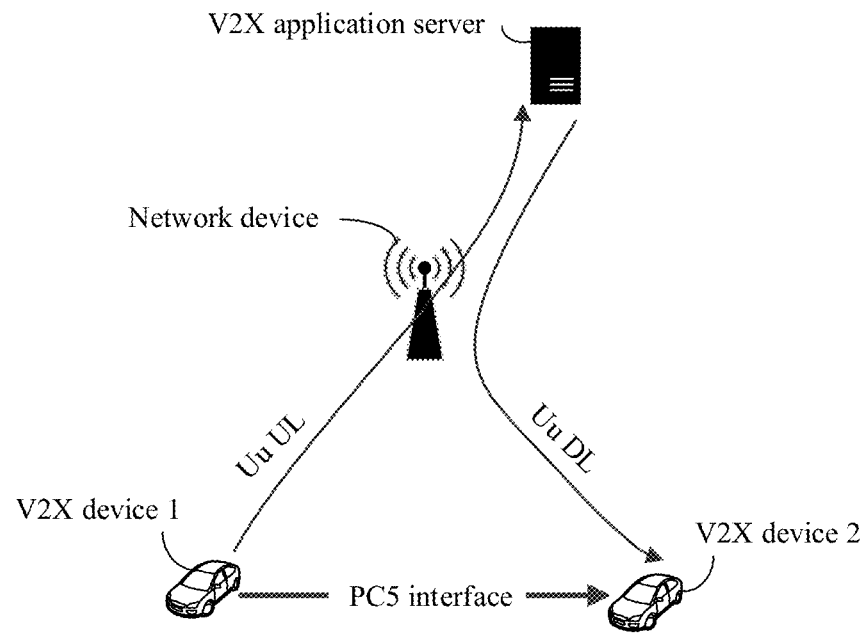
FIG. 1 is an example diagram of a system architecture to which the embodiments of this application are applied.

The following describes technical solutions of this application with reference to the accompanying drawings.

In the descriptions of the embodiments of this application, unless otherwise stated, "a plurality" or "a plurality of" means two or more than two.

The technical solutions in the embodiments of this application may be applied to various communication systems, for example, a long term evolution (LTE) system, an LTE frequency division duplex (FDD) system, and an LTE time division duplex (TDD) system, a worldwide interoperability for microwave access (WiMAX) communication system, a 5th generation (5G) system or a new radio (NR) system, a vehicle to everything (V2X) system, and a device to device (D2D) system. Optionally, the V2X system may be specifically any one of the following systems: vehicle to network (V2N), vehicle to vehicle communication (V2V), and vehicle to pedestrian (V2P), vehicle to infrastructure (V2I), and the like.

One participant of V2N is a terminal device, and the other participant is a service entity. V2N is currently the most widely used form of the internet of vehicles, and a main function of V2N is to enable a vehicle to connect to a cloud server through a mobile network, so as to provide a function, such as navigation, entertainment, or anti-theft, through the cloud server.

Both participants of V2V are terminal devices. V2V may be used for information exchange and reminding between vehicles, and most typical application is an anti-collision safety system between vehicles.

Both participants of V2P are terminal devices. V2P can be used to provide a safety warning to a pedestrian or a non-motor vehicle on a road.

In V2I, one participant is a terminal device, and the other participant is an infrastructure (or a road facility). V2I may be used for communication between a vehicle and an infrastructure. For example, the infrastructure may be a road, a traffic light, a barricade, or the like, and road management information such as a time sequence of a traffic light signal may be obtained.

The terminal device in the embodiments of this application may be user equipment (UE), a subscriber station (SS), or customer premise equipment (CPE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, an in-vehicle communication apparatus, an in-vehicle communication chip, a wearable device, a terminal device in a future 5G network, a terminal device in a future evolved public land mobile network (PLMN), or the like. This is not limited in the embodiments of this application. The terminal device may alternatively be a software and/or a hardware module deployed in an autonomous vehicle, an intelligent vehicle, a digital vehicle, or an internet-of-vehicles vehicle. The terminal device in the embodiments of this application may be a D2D device, a V2X device, or a road side unit (RSU).

A network device in the embodiments of this application may be a device configured to communicate with a terminal device. The network device may be a base transceiver station (BTS), or may be a NodeB (NB) in a wideband code division multiple access (WCDMA) system, or may be an evolved NodeB (eNB or eNodeB) in an LTE system, or may be a wireless controller in a cloud radio access network (CRAN) scenario. Alternatively, the network device may be a relay station, an access point, a vehicle-mounted device, an in-vehicle communication apparatus, an in-vehicle communication chip, a wearable device, a next generation NodeB (gNB) in a future 5G network, a transmission point, a base station in a future mobile communication system, an access node in a wireless fidelity (Wi-Fi) system, one antenna panel or one group of antenna panels (including a plurality of antenna panels) of a base station in a 5G system, or a 5G relay node, or may be a network node that constitutes a gNB or a transmission point, for example, a baseband unit (BBU) or a distributed unit (DU). A specific technology and a specific device form used by a radio access network device are not limited in the embodiments of this application. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Because information of the RRC layer is finally carried in information of the PHY layer, in this architecture, higher layer signaling, such as RRC layer signaling, may also be considered as being sent by the DU, or sent by the DU+AAU. It may be understood that the network device may be a device including one or more of a CU node, a DU node, and an AAU node. In the embodiments of this application, the network device may alternatively be a road side unit RSU.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk drive, a floppy disk, or a magnetic tape), an optical disc (for example, a compact disc (CD) or a digital versatile disc (DVD), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel, and various other media that can store, include, and/or carry instructions and/or data.

FIG. 1 is an example diagram of a system architecture to which the embodiments of this application are applied. As shown in FIG. 1, a communication system includes a V2X application server, V2X devices (including a V2X device 1 and a V2X device 2), and a network device. The V2X devices communicate with each other through a PC5 interface. A direct communication link between the V2X devices may be referred to as a sidelink (SL). Communication between the V2X device and the V2X application server requires forwarding by the network device. Specifically, for uplink, a transmit-end V2X device sends V2X data to the network device through a Uu interface, the network device sends the data to the V2X application server for processing, and then the V2X application server delivers the data to a receive-end V2X device. For downlink, the V2X application server sends V2X data to the network device, and the network device sends the V2X data to the V2X device through a Uu interface.

It should be understood that the V2X device in FIG. 1 is an internet of things device, for example, UE.

It should be further understood that an arrow direction in FIG. 1 is merely described by using the V2X device 1 as an example, and constitutes no limitation on this embodiment of this application. Actually, communication between the V2X device 1 and the V2X device 2 may be bidirectional, and the V2X device 2 may also perform uplink communication with the network device. This is not specifically limited.

Figure 2:
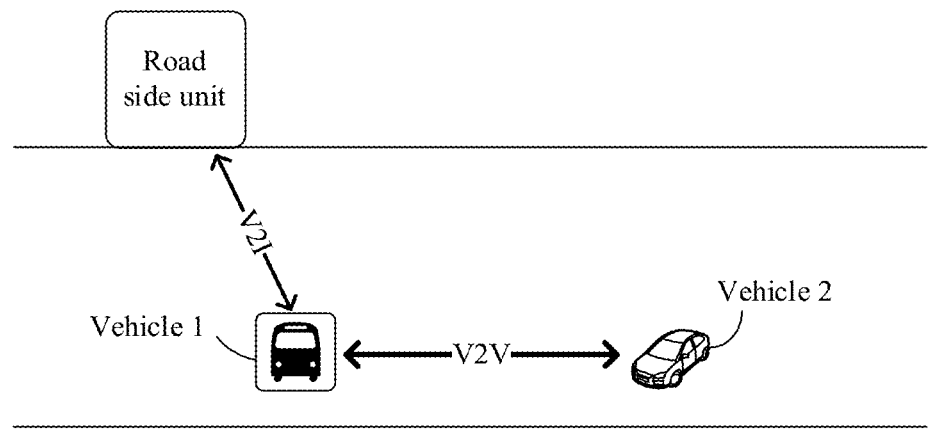
FIG. 2 is an example diagram of a system architecture to which the embodiments of this application are applied.

FIG. 2 is an example diagram of a system architecture to which the embodiments of this application are applied. As shown in FIG. 2, a vehicle 1 and a vehicle 2 communicate with each other through V2V. A vehicle may broadcast, to a surrounding vehicle, information such as a vehicle speed, a driving direction, a specific location, and whether an emergency brake is pressed. A driver of the surrounding vehicle can better learn of a traffic status outside a line of sight by obtaining the information, and therefore, can predict and avoid a risk status in advance. In V2I communication, in addition to exchange of the foregoing security information, a road side infrastructure such as a road side unit RSU may provide various types of service information and data network access for the vehicle. Functions such as electronic toll collection and in-vehicle entertainment can greatly improve transportation intelligence.

It should be understood that two vehicles are used as an example for description in FIG. 2, but the protection scope is not limited. Actually, there may be a plurality of vehicles, and the plurality of vehicles may communicate with each other through V2V.

Some terms or concepts that may be provided in the embodiments of this application are briefly explained below.

A hybrid automatic repeat request (HARQ) is a technology integrating a forward error correction (FEC) method and an automatic repeat request (ARQ) method. FEC enables a receive end to correct some errors by adding redundant information, to reduce a number of retransmissions. For an error that the FEC cannot correct, the receive end requests a transmit end to retransmit data by using an ARQ mechanism. The receive end detects, by using an error detection code, for example, a cyclic redundancy check (CRC), whether an error occurs in a received data packet. If no error occurs, the receive end sends an acknowledgement (ACK) to the transmit end, and after receiving the ACK, the transmit end sends a next data packet. If an error occurs, the receive end sends a negative acknowledgement (NACK) to the transmit end, and after receiving the NACK, the transmit end retransmits the data packet. In a HARQ mechanism, a piece of data may be sent for a plurality of times, and data sent in the plurality of times may be different RVs of the data, and data rates, spatial domain information, and the like in the plurality of times of sending may also be different. The data sent for the plurality of times can be combined and decoded to obtain original data. In addition, the transmit end may also actively retransmit data without receiving the ACK/NACK sent by the receive end.

In NR V2X, for a PC5 interface, there are two modes in which a terminal device obtains a V2X SL resource: a manner of resource allocation scheduled by a base station, and a manner in which the terminal device autonomously selects a resource. For example, the resource allocation manner scheduled by the base station may be referred to as a "mode 1". For example, the manner in which the terminal device autonomously selects a resource may be referred to as a "mode 2". In the mode 1, before sending V2X service data, the terminal device needs to first request a resource from the base station, and the base station allocates a V2X SL resource as required. The base station may perform resource allocation by using a dedicated radio network temporary identifier (RNTI) of the terminal device. In the mode 2, the base station configures a V2X SL resource through system information broadcast or dedicated signaling. The terminal device may obtain the V2X SL resource through contention. It should be understood that, the foregoing descriptions are provided only by using an example in which the resource allocation manner scheduled by the base station is named "mode 1" and the manner in which the terminal device autonomously selects a resource is named "mode 2". However, naming of the resource allocation manner scheduled by the base station and the manner in which the terminal device autonomously selects a resource do not limit the protection scope of the embodiments of this application. Actually, with evolution of NR V2X, the resource allocation manner scheduled by the base station and the manner in which the UE autonomously selects a resource may alternatively be named other names. Regardless of naming, the naming is applicable to the embodiments of this application. Alternatively, the base station may be replaced with a network device. This is not limited.

Descriptions are centrally provided herein. For ease of description, an example in which a first terminal device is transmit-end UE and a second terminal device is receive-end UE is used for description below.

FIG. 3 is a schematic flowchart of a hybrid automatic repeat request HARQ feedback information transmission method 300 according to an embodiment of this application. As shown in FIG. 3, the method 300 includes the following steps.

S310: A first terminal device determines, based on a first correspondence, a feedback manner type and/or a communication type that are/is corresponding to a current transmission.

The feedback manner type includes a first HARQ feedback manner or a second HARQ feedback manner. The first HARQ feedback manner means that a terminal device feeds back an acknowledgement message or a non-acknowledgement message, and the second HARQ feedback manner means that a terminal device feeds back only a non-acknowledgement message.

Optionally, the method 300 further includes: The first terminal device obtains a transmission resource. For ease of description, an example in which the first terminal device is transmit-end UE and a second terminal device is receive-end UE is used for description below.

For example, the transmission resource may be configured by a base station for the transmit-end UE in a manner of mode 1, or may be obtained through autonomous contention by the transmit-end UE in a manner of mode 2. This is not specifically limited.

For example, the base station allocates a grant resource to the transmit-end UE.

Optionally, the transmission resource may carry property information, or may not carry property information. This is not limited. Descriptions are centrally provided herein. The property information includes one or more of the following: a HARQ feedback manner type, HARQ enabled/disabled information, or a communication type (for example, broadcast, groupcast, or unicast) corresponding to the HARQ feedback manner type.

Herein, the property information in the transmission resource is used to indicate one or more of the following: a HARQ feedback manner supported by the transmission resource, HARQ enabled/disabled information (which may be understood as an enable switch used to indicate whether to perform feedback) supported by the transmission resource, or a corresponding communication type cast-type (for example, broadcast, groupcast, or unicast) used in data transmission performed by using the transmission resource. For example, the property information may indicate the HARQ feedback manner supported by the transmission resource, or may indicate the HARQ enabled/disabled information supported by the transmission resource, or may indicate the HARQ feedback manner and the HARQ enabled/disabled information that are supported by the transmission resource.

If the HARQ enabled/disabled information is HARQ enabled, it indicates that feedback information can be sent. If the HARQ enabled/disabled information is HARQ disabled, it indicates that feedback information cannot be sent. That is, the property information may be further used to indicate whether to send the feedback information.

Optionally, the communication type includes groupcast, broadcast, or unicast.

Optionally, if the transmission resource does not carry the communication type, the first terminal device may determine the communication type according to a preset rule. Optionally, the first terminal device may notify a second terminal device of the communication type carried in SCI or a MAC CE.

Optionally, if the property information carries the HARQ enabled/disabled information (HARQ enabled/disabled), the determined feedback manner type may also include a corresponding feedback manner. For example, if the feedback manner type includes HARQ enabled, the feedback manner type may further include the first HARQ feedback manner or the second HARQ feedback manner.

For example, the method 300 further includes: The transmit-end UE obtains the first correspondence. The first correspondence may be predefined, or may be sent by a network device, or may be notified to the transmit-end UE by another UE (for example, UE in groupcast transmission), or may be generated by the transmit-end UE itself. This is not limited.

Similarly, the receive-end UE may also obtain the first correspondence. The first correspondence may be predefined, or may be sent to the receive-end UE by the network device, or may be notified to the receive-end UE by another UE (for example, the transmit-end UE, or another UE in groupcast members), or may be generated by the receive-end UE itself. This is not limited.

For example, the first correspondence includes a correspondence between a first granularity and a HARQ feedback manner, and the first granularity may include one or more of the following: a source address identifier (for example, a source (SRC) identifier (ID)), a destination address identifier (for example, a destination (DEST) ID), a service type, a service identifier (Service ID), a communication type (for example, groupcast, broadcast, or unicast), a logical channel (LCH) identifier (LCH ID), a sidelink radio bearer (SL RB), quality of service (QoS) information, a transmission resource (for example, a grant carried in DCI scheduled for a particular time, or a CG type 1/2 index configured by a network), a HARQ process identifier (ID), a logical channel group (LCG) identifier (LCG ID), a transmission resource type (where for example, the transmission resource may be a dynamic grant Dynamic Grant resource, a configured grant Configured Grant resource, a semi-persistent scheduling resource SPS Grant, a mode 2 resource, or the like), an identifier of the transmit-end user equipment UE, or an identifier of the receive-end UE.

S320: The first terminal device performs data packet assembly processing based on the feedback manner type.

S330: The first terminal device sends a data packet by using the transmission resource. Correspondingly, the second terminal device receives the data packet.

In this embodiment of this application, the first terminal device may determine the feedback manner type based on the first correspondence, perform data packet assembly processing after determining the feedback manner type, and finally send the data packet by using the transmission resource, so that the HARQ feedback manner can be flexibly determined.

For the second terminal device, as shown in FIG. 4, the second terminal device may perform the following method: S410: The second terminal device receives the data packet. S420: The second terminal device determines a feedback manner type used for performing feedback on the data packet. S430: The second terminal device performs feedback by using the feedback manner type. The second terminal device is a transceiver device corresponding to the first terminal device. If the first terminal device is the transmit-end UE, the second terminal device is the receive-end UE.

For example, after determining the feedback manner type, the transmit-end UE may indicate a feedback manner type of a single transmission to the receive-end UE by using the SCI or the MAC CE. A PHY layer of the receive-end UE can demodulate SCI signaling and data, and deliver a service in which PHY is interested to a MAC layer. The MAC layer or the PHY layer of the receive-end UE may determine, according to a specific principle, whether receiving is successful. For an initial transmission, the MAC entity or the PHY entity directly determines whether the receiving is successful. For a retransmission, the MAC entity or the PHY entity performs HARQ soft combination according to a specific rule (for example, searches an initial transmission data buffer based on a Tx UE ID, a DEST ID, a HARQ ID, and the like, and performs soft combination between different redundancy versions (RVs)), and after the combination, determines whether a final result is a success or a failure. The MAC layer or the PHY layer of the receive-end UE may determine whether to perform HARQ feedback. If the feedback is required, a feedback manner indicated by the transmit-end UE may be used for feedback. Optionally, the receive-end UE may alternatively obtain, by searching the first correspondence, information about whether to perform HARQ feedback.

For example, if the first correspondence includes a correspondence between an identifier of transmit-end UE and a HARQ feedback manner, the receive-end UE may search the first correspondence for a corresponding HARQ feedback manner based on an identifier of transmit-end UE carried in received data; if the first correspondence includes a correspondence between an identifier of transmit-end UE and a DEST ID, and a HARQ feedback manner, the receive-end UE may search the first correspondence for a corresponding HARQ feedback manner based on an identifier of transmit-end UE and a DEST ID that are carried in received data; if the first correspondence includes a correspondence between an identifier of transmit-end UE and a service type, and a HARQ feedback manner, the receive-end UE may search the first correspondence for a corresponding HARQ feedback manner based on an identifier of transmit-end UE and a service type that are carried in received data; if the first correspondence includes a correspondence between an identifier of transmit-end UE and a service identifier, and a HARQ feedback manner, the receive-end UE may search the first correspondence for a corresponding HARQ feedback manner based on an identifier of transmit-end UE and a service identifier that are carried in received data; if the first correspondence includes a correspondence between an identifier of transmit-end UE and a communication type, and a HARQ feedback manner, the receive-end UE may search the first correspondence for a corresponding HARQ feedback manner based on an identifier of transmit-end UE and a communication type that are carried in received data; if the first correspondence includes a correspondence between an identifier of transmit-end UE and an LCH ID, and a HARQ feedback manner, the receive-end UE may search the first correspondence for a corresponding HARQ feedback manner based on an identifier of transmit-end UE and an LCH ID that are carried in received data; if the first correspondence includes a correspondence between an identifier of transmit-end UE and QoS, and a HARQ feedback manner, the receive-end UE may search the first correspondence for a corresponding HARQ feedback manner based on an identifier of transmit-end UE and QoS that are carried in received data; or the like. Details are not described herein again. It may be understood that the example herein is only for description by using a part of the first granularity as an example, but does not constitute a limitation on the protection scope of the embodiments of this application. Actually, there may be more possible combinations for searching the first correspondence for a corresponding HARQ feedback manner by using the first granularity. A person skilled in the art may learn of these combinations based on the foregoing example. For brevity, details are not described herein again.

It may be understood that a UE identifier may be an SL UE identifier, for example, a layer (L) 1 ID or an L2 ID. The DEST ID may be an Rx UE ID in unicast, or may be a Group ID or a service ID in groupcast, or may be a service ID in broadcast. The Group ID and a service ID may alternatively be L1 IDs or L2 IDs. The SRC ID may alternatively be an L1 ID or an L2 ID. The DEST ID may alternatively be an L1 ID or an L2 ID.

Descriptions are centrally provided herein. "DEST" and "DEST ID" are alternately used below, and both may represent a communication target. "SRC" and "SRC ID" are used alternately below, and both may represent a communication source. "LCH" and "LCH ID" are used alternately below, and both may represent a logical channel.

In this embodiment of this application, after obtaining the transmission resource, the transmit-end UE determines, based on the first correspondence, a feedback manner type used for this transmission, performs data packet assembly processing based on the feedback manner type, and finally sends the data packet by using the transmission resource, so that the feedback manner type can be flexibly determined.

In this embodiment of this application, for whether the transmission resource carries the property information, the transmit-end UE has different processing manners, which are separately described below.

Manner 1: It is assumed that the transmission resource carries the property information. In this case, before the transmit-end UE performs data packet assembly processing, the method 300 further includes: The transmitting-end UE sifts out, based on the property information, from the first correspondence, at least one DEST and/or logical channel whose HARQ feedback manners/HARQ feedback manner are/is the same as the HARQ feedback manner supported by the transmission resource; and the transmit-end UE sends, on the transmission resource, data in the at least one DEST and/or logical channel. "At least one" means "one or more".

For example, it is assumed that the first correspondence includes a correspondence between a DEST and a logical channel identifier, and a HARQ feedback manner. In this case, when performing DEST and logical channel filtering, the transmit-end UE may sift out, from the first correspondence and based on the HARQ feedback manner supported by the transmission resource, at least one DEST and logical channel that are the same as the HARQ feedback manner supported by the transmission resource, and fill the transmission resource with data in the DEST and logical channel.

For example, (1) if the transmission resource can be used only for a groupcast NACK only transmission, one or more of corresponding information that can support only a Groupcast NACK only feedback manner need to be selected from the following: a communication type, a DEST, LCHs, SL RBs, QoS, or a HARQ process ID. It may be understood that only some content in the first granularity is used as an example for description herein. Actually, the first granularity may alternatively be another combination described above. This is not limited.

(2) If the transmission resource can be used only for a Groupcast ACK/NACK transmission, one or more of corresponding information that can support only a Groupcast ACK/NACK feedback manner need to be selected from the following: a communication type, Tx, a DEST, LCHs, SL RBs, QoS, or a HARQ process ID. It may be understood that only some content in the first granularity is used as an example for description herein. Actually, the first granularity may alternatively be another combination described above. This is not limited.

(3) If the transmission resource can be used only for a transmission whose HARQ enable switch is HARQ enabled, one or more of corresponding information that can support only HARQ enabled need to be selected from the following: a communication type, a Tx UE ID, a DEST, LCHs, SL RBs, QoS, or a HARQ process ID. It may be understood that only some content in the first granularity is used as an example for description herein. Actually, the first granularity may alternatively be another combination described above. This is not limited.

(4) If the transmission resource can be used only for a transmission whose HARQ enable switch is HARQ disabled, one or more of corresponding information that can support only HARQ disabled need to be selected from the following: a communication type, a Tx UE ID, a DEST, LCHs, SL RBs, QoS, or a HARQ process ID. It may be understood that only some content in the first granularity is used as an example for description herein. Actually, the first granularity may alternatively be another combination described above. This is not limited.

(5) If the transmission resource can be used only for unicast and/or groupcast transmission with HARQ disabled, one or more items having no corresponding HARQ feedback requirement need to be selected from the following: a communication type, a UE ID, a DEST, LCHs, SL RBs, QoS, or a HARQ ID. It may be understood that only some content in the first granularity is used as an example for description herein. Actually, the first granularity may alternatively be another combination described above. This is not limited.

(6) If the transmission resource can be used only for unicast and/or groupcast transmission with HARQ enabled, one or more items having a corresponding HARQ feedback requirement need to be selected from the following: a communication type, a UE ID, a DEST, LCHs, SL RBs, QoS, or a HARQ ID.

(7) If the transmission resource can be used only for a Groupcast ACK/NACK transmission, and a number of feedback resources is 5, one or more corresponding items that can support only Groupcast ACK/NACK feedback and whose number of group members is less than or equal to 5 are selected from the following: a Tx UE ID, a DEST, LCHs, SL RBs, QoS, or a HARQ process ID. It may be understood that only some content in the first granularity is used as an example for description herein. Actually, the first granularity may alternatively be another combination described above. This is not limited.

(8) If the transmission resource can be used only for a Groupcast NACK only transmission and a range calculation manner is the GPS, one or more corresponding items that can support only Groupcast NACK only and whose range calculation can be performed only through the GPS need to be selected from the following: a Tx UE ID, a DEST, LCHs, SL RBs, QoS, or a HARQ process ID. It may be understood that only some content in the first granularity is used as an example for description herein. Actually, the first granularity may alternatively be another combination described above. This is not limited.

For example, after performing DEST and logical channel filtering (selecting a DEST and a logical channel that match a Grant property), the transmit-end UE may select a DEST of data sending. For example, the transmit-end UE may use, as a priority of the DEST, a priority (or a corresponding QoS level) of a logical channel that has data in different DESTs, and then select data in a logical channel with a highest DEST priority and send the data. If this transmission has a remaining transmission resource after the data in the logical channel with the highest DEST priority is selected for filling, filling of data in another logical channel with a same DEST is performed (where for example, filling may be performed in descending order of LCH priorities or in descending order of QoS priorities of QoS flows corresponding to the LCHs.) A MAC layer of the transmit-end UE may send a transport block TB filled in this transmission to a physical PHY layer, and indicate the PHY layer to perform sending; and the PHY layer of the transmit-end UE sends data of this transmission. Optionally, if HARQ information needs to be fed back in this transmission, the transmit-end UE may receive a feedback result on a corresponding feedback time-frequency resource, then determine, based on a feedback result, whether a retransmission is required, and if the retransmission is required, perform the retransmission.

Manner 2: It is assumed that the transmission resource does not carry the property information. In this case, before the transmit-end UE performs data packet assembly processing, the method 300 further includes: The transmit-end UE transmits, on the transmission resource, data in a plurality of DESTs and/or logical channels, where a feedback manner corresponding to each of the plurality of DESTs and/or logical channels is the same or different.

For example, if the transmission resource does not carry a supported feedback manner type, the transmit-end UE may not perform DEST and logical channel filtering, and may transmit, on the transmission resource, logical channels having different feedback manner types; or may perform DEST and logical channel filtering, and may transmit, on the transmission resource, data in DESTs and logical channels having a same feedback manner type.

Manner 3: It is assumed that the transmission resource does not carry the property information. In this case, before or after the transmit-end UE performs data packet assembly processing, the method 300 further includes: The transmit-end UE determines, for the transmission resource, a HARQ feedback manner and/or a communication type that are/is supported by the transmission resource; the transmit-end UE sifts out, from the first correspondence, at least one DEST and/or logical channel whose HARQ feedback manners/ HARQ feedback manner and/or communication types/ communication type are/is the same as the HARQ feedback manner and/or the communication type that are/is supported by the transmission resource; and the transmit-end UE sends, on the transmission resource, data in the at least one DEST and/or the logical channel.

In the manner 3, for example, the transmit-end UE may add the property information for the transmission resource. After the transmission resource has the property information, for subsequent behavior of the transmit-end UE, refer to the descriptions in the manner 1. To avoid redundancy, details are not described herein again.

Herein, in the manner 3, the transmit-end UE may determine a supported HARQ feedback manner for the transmission resource in the following manner: (1) A protocol may define an always preferential HARQ feedback manner. For example, if the UE needs to send both DEST and/or LCH data with HARQ enabled, and DEST and/or LCH data with HARQ disabled, it may be defined in the protocol that sending of the data corresponding to HARQ enabled always precedes over sending of the data corresponding to HARQ disabled. Alternatively, a policy may be flexibly configured in a manner such as an SIB or an RRC message (where for example, the data corresponding to HARQ enabled precedes over the data corresponding to HARQ disabled, or the data corresponding to HARQ disabled precedes over the data corresponding to HARQ enabled). (2) After the transmit-end UE performs data packet assembly processing, the transmit-end UE may use, as a property of the transmission resource, a HARQ feedback manner corresponding to QoS (or an LCH or a DEST) that has a highest priority and to-be-transmitted data and that is in different communication types. (3) The transmit-end UE may not determine the property of the transmission resource, but allows any data packet assembly for transmission (where for example, for different LCHs having a same DEST, if HARQ enabled/ disabled information corresponding to some LCHs is HARQ enabled, and HARQ enabled/disabled information corresponding to some LCHs is HARQ disabled, the LCHs may be multiplexed onto a same TB for simultaneous transmission). However, when feedback information is sent, a unique feedback manner is determined. For the unique feedback manner, a property may be determined based on a strictest definition. For example, for HARQ disabled/enabled, it is determined that the property information is HARQ enabled. For another example, for Groupcast HARQ ACK/NACK and HARQ NACK only, it is determined that the property information is HARQ ACK/NACK. Alternatively, property information corresponding to a strictest definition may be predefined by the network.

The transmit-end UE may notify the receive-end UE of the feedback manner type in an explicit manner or an implicit manner. Optionally, the method 300 further includes: The transmit-end UE sends second information to the receive-end UE, where the second information is used by the receive-end UE to determine the feedback manner type. Correspondingly, the receive-end UE receives the second information, and determines, based on the second information, the feedback manner type corresponding to the current transmission.

For example, the transmit-end UE may send the second information to the receive-end UE by using one or more of the following: sidelink control information SCI, SL MAC signaling, SL RRC signaling, SL SIB information, PC5-S, or an application layer message. Correspondingly, the receive-end UE may receive the second information that is sent by the transmit-end UE to the receive-end UE by using one or more of the following: the sidelink control information SCI, the SL MAC signaling, the SL RRC signaling, the SL SIB information, the PC5-S, or the application layer message. Herein, the transmit-end UE may directly send the second information to the receive-end UE, or may forward the second information to the receive-end UE by using another node (for example, UE). This is not limited.

For example, the second information may indicate the feedback manner type of the single transmission. After receiving the second information, the receive-end UE may perform feedback on this transmission based on the feedback manner type indicated by the second information. For example, the transmit-end UE may indicate to the receive-end UE in each data transmission: For groupcast and unicast, the transmit-end UE may indicate, in SCI or a MAC CE, whether a feedback (for example, enabled or disabled) is required. For groupcast, in SCI or a MAC CE, the transmit-end UE may indicate a feedback manner type (for example, HARQ enabled/disabled, and/or a HARQ feedback manner type (including HARQ ACK/NACK, or HARQ NACK only)) of this groupcast, and/or a feedback time-frequency resource location. Optionally, if the feedback manner type indicated by the transmit-end UE is the HARQ NACK only manner, the transmit-end UE may further indicate, in the SCI or the MAC CE, one or more of the following: a range calculation manner, a range threshold, location information of the transmit-end UE, a base station ID, a zone ID, or the like in this groupcast feedback.

For example, the transmit-end UE may send a feedback manner type of a plurality of transmissions to the receive-end UE, where the feedback manner type of the plurality of transmissions is included in the second information. For example, the second information includes one or more of the following information: a destination address identifier, a source identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier. For example, the transmit-end UE may indicate the feedback manner type of the plurality of transmissions to the receive-end UE by using RRC signaling. It should be understood that an RRC message is merely used as an example for description herein, and does not constitute a limitation on this embodiment of this application. The transmit-end UE may alternatively send the second information to the receive-end UE by using another message. After obtaining an RRC message, the receive-end UE may search the first correspondence based on the second information (or the foregoing first granularity) for the feedback manner type corresponding to the current transmission.

Optionally, before sending the second information to the receive-end UE, the transmit-end UE may receive the first information from the network device. For example, the network device sends the first information to the transmit-end UE.

For example, the network device sends the first information to the transmit-end UE by using one or more of the following: downlink control information DCI, radio resource control RRC signaling, system information block SIB information, a MAC message, or a service data adaptation protocol (SDAP) message, a PDCP message, an RLC message, a NAS message, an OAM message, or another message. Correspondingly, the transmit-end UE receives the first information. Herein, the network device may send the first information to the transmit-end UE by using a single message, for example, send the first information to the transmit-end UE by using DCI, RRC signaling, system information block SIB information, a MAC message, an SDAP message, a PDCP message, an RLC message, a NAS message, or an operation, administration and maintenance (OAM) message.

Alternatively, the network device may send the first information to the transmit-end UE in a manner of configuring a feedback manner type by using one message and activating the feedback manner type by using another message. For example, a plurality of feedback manner types are configured by using an RRC message, and the feedback manner type of the single transmission is indicated by using a MAC message. For another example, a plurality of feedback manner types are configured by using SIB information/RRC signaling, and the feedback manner type of the single transmission is indicated by using DCI. Optionally, the transmit-end UE may send a response message to the network device, to indicate whether the configuration is activated, or whether the configuration succeeds or fails.

For example, the first information indicates the feedback manner type of the single transmission.

For example, the receive-end UE receives a feedback manner type of a plurality of transmissions that is sent by the network device, where the feedback manner type of the plurality of transmissions is included in the first information. After receiving the first information, the transmit-end UE may process the feedback manner type indicated by the first information, to obtain the second information, and send the second information to the receive-end UE; or directly send the first information to the receive-end UE.

For the receive-end UE, the receive-end UE may receive the second information from the transmit-end UE, and then determine the feedback manner type based on the second information; or may receive the first information from the network device, and then determine the feedback manner type based on the first information.

For example, the receive-end UE receives the first information sent by the network device, where the first information is used to determine the feedback manner type. The receive-end UE determines, based on the first information, the feedback manner type corresponding to the current transmission.

For example, the network device sends the first information to the receive-end UE by using one or more of the following: downlink control information DCI, radio resource control RRC signaling, system information block SIB information, a MAC message, an SDAP message, a PDCP message, an RLC message, a NAS message, an OAM message, or another message. Correspondingly, the receive-end UE receives the first information. Herein, for specific descriptions of sending the first information to the receive-end UE by the network device, refer to the foregoing descriptions of sending the first information to the transmit-end UE by the network device. To avoid redundancy, details are not described herein again.

For example, the first information indicates the feedback manner type of the single transmission. After receiving the first information, the receive-end UE may perform feedback on this transmission based on the feedback manner type indicated by the first information.

For example, the receive-end UE receives a feedback manner type of a plurality of transmissions that is sent by the network device, where the feedback manner type of the plurality of transmissions is included in the first information. The receive-end UE determines, based on the first information and the first correspondence, the feedback manner type corresponding to the current transmission.

In this embodiment of this application, the receive-end UE may alternatively obtain the feedback manner type by searching the first correspondence. For example, the receive-end UE receives a first granularity carried in each data packet, and compares the first granularity with a matched first granularity in the first correspondence. If a received first granularity matches the first granularity in the first correspondence (where for example, a granularity carried in a data packet is the same as the first granularity in the first correspondence), the receive-end UE may obtain corresponding property information.

For example, the first correspondence includes a correspondence between a DEST and a HARQ feedback manner. For example, if the first correspondence includes {DEST 1, NACK only}, it indicates that after receiving data of the DEST 1, the receive-end UE needs to perform HARQ feedback; and feeds back a NACK only when demodulation fails, and does not perform feedback under another condition (such as a demodulation success or an SCI demodulation error). For another example, if the first correspondence includes {DEST 2, ACK/NACK}, it indicates that after receiving data of the DEST 2, the receive-end UE needs to perform HARQ feedback; and the HARQ feedback specifically includes: feeding back a NACK when demodulation fails, and feeding back an ACK when demodulation succeeds. For another example, if the first correspondence includes {DEST 3, disabled}, it indicates that after receiving data of the DEST 3, the receive-end UE does not need to perform HARQ feedback regardless of whether demodulation succeeds.

For example, the first correspondence includes the foregoing mapping between a first granularity and a HARQ feedback manner. For example, if the first correspondence includes {DEST 1+LCH 1, NACK only}, it indicates that after receiving data of the DEST 1, the receive-end UE performs NACK only feedback if data of the LCH 1 is transferred in the data. For data of another DEST or data of another LCH of the DEST 1, the receive-end UE does not perform feedback. Optionally, a protocol may predefine a default configuration. In this way, if no feedback manner type is matched, the default configuration predefined by the protocol may be used. For example, HARQ ACK/NACK is predefined by a protocol, or may be configured by the transmit-end UE. This is not limited.

For example, the first correspondence includes a mapping between a Tx UE ID and a HARQ feedback manner. For example, if the first correspondence includes {Tx ID 1, NACK only}, it indicates that after receiving data sent by the Tx UE ID 1, the receive-end UE needs to perform HARQ feedback; and feeds back a NACK only when demodulation fails, and does not perform feedback under another condition (such as a demodulation success or an SCI demodulation error). It may be understood that the foregoing describes only the first correspondence as an example, and does not constitute a limitation on this embodiment of this application.

In this embodiment of this application, for the receive-end UE, that the receive-end UE performs feedback by using a feedback manner type includes: If the feedback manner type is the first HARQ feedback manner, and the receive-end UE sends an acknowledgement message or a non-acknowledgement message for a data packet. Alternatively, if the feedback manner type is the second HARQ feedback manner, the receive-end UE feeds back only a non-acknowledgement message for the data packet. For example, the PHY layer of the receive-end UE performs corresponding sending on a corresponding feedback time-frequency resource: if the first HARQ feedback manner is used, feeds back an ACK or a NACK on a PHY HARQ feedback time-frequency resource 1; or if the second HARQ feedback manner is used, feeds back a NACK on a PHY HARQ feedback time-frequency resource 2. Optionally, location information of the feedback time-frequency resource may be notified to the PHY layer by the MAC layer of the receive-end UE, or calculated by the PHY layer. This is not limited.

If the feedback manner type is the second HARQ feedback manner, the receive-end UE determines a range between the receive-end UE and the transmit-end UE; and when the range meets a range threshold, the receive-end UE determines that a non-acknowledgement message needs to be sent. For example, the receive-end UE may calculate the range between the receive-end UE and the transmit-end UE, and then determine, based on the range, whether the receive-end UE needs to feed back a NACK message. If the range meets the range threshold, for example, if the range is less than or equal to the range threshold, and the range threshold is 100 meters, it is determined that a NACK message needs to be sent when demodulation fails in this data transmission; or if the range is greater than the range threshold, it is determined that no feedback is performed in this data transmission.

If the receive-end UE determines that feedback is required and obtains a corresponding feedback ACK or NACK, the receive-end UE may notify the PHY layer to perform feedback. If the receive-end UE determines that feedback is not required, the receive-end UE does not notify the PHY layer to perform feedback, or notifies the PHY layer to skip performing feedback. Alternatively, optionally, the PHY layer of the receive-end UE may determine whether to feed back an ACK/a NACK, and determine, by itself, a feedback manner type and a feedback result of this data transmission. Alternatively, optionally, the MAC layer of the receive-end UE determines a feedback manner type, and notifies the PHY layer of the feedback manner type. If the feedback manner type is HARQ ACK/NACK, the PHY layer determines whether an ACK or a NACK is fed back in this transmission. Alternatively, optionally, the MAC layer of the receive-end UE not only determines a feedback manner type, but also determines a feedback result, and then notifies the PHY layer to perform corresponding feedback.

The receive-end UE may obtain information such as a range calculation manner and a range threshold by using the transmit-end UE or the network device. For example, the transmit-end UE sends third information to the receive-end UE, where the third information includes one or more of the following information: a communication type (for example, groupcast, unicast, or broadcast), a range threshold, or a manner of calculating a range between the transmit-end UE and the receive-end UE. Correspondingly, the receive-end UE may receive the third information sent by the transmit-end UE. For example, the receive-end UE may calculate the range between the receive-end UE and the transmit-end UE based on the range calculation manner sent by the transmit-end UE, and then determine, by using the range threshold, whether the range is less than the range threshold.

For example, the range calculation manner includes any one of the following manners: calculating the range between the transmit-end UE and the receive-end UE by using a GPS signal of the transmit-end UE; calculating the range between the transmit-end UE and the receive-end UE based on a zone ID; or estimating the range between the transmit-end UE and the receive-end UE based on reference signal received power (reference signal received power, RSRP) of the transmit-end UE. For the manner of estimating the range based on the RSRP, it is assumed that the receive-end UE learns of transmit power of the transmit-end UE and measures SL RSRP based on a reference signal sent by the transmit-end UE, and a path loss between the two UEs may be learned of. In this case, because a large path loss is linearly related to the range, a value between two UEs can be estimated based on the SL RSRP.

Alternatively, for example, the network device sends fourth information to the receive-end UE, where the fourth information includes one or more of the following information: an SRC ID, a DEST ID, a Group ID, a service identifier, a communication type (for example, groupcast, unicast, or broadcast), a range threshold, or a manner of calculating a range between the transmit-end UE and the receive-end UE. Correspondingly, the receive-end UE may receive the fourth information sent by the network device. For example, the receive-end UE may calculate the range between the receive-end UE and the transmit-end UE based on the range calculation manner sent by the network device, and then determine, by using the range threshold, whether the range is less than the range threshold. Alternatively, before the transmit-end UE sends the third information to the receive-end UE, the network device may send the fourth information to the transmit-end UE. When calculating the range, the receive-end UE may calculate the range between the receive-end UE and the transmit-end UE by using one or more of the following information: a zone identifier, location information of the transmit-end UE, power information of the transmit-end UE, an identifier of the network device, an identifier of a zone in which the transmit-end UE is located, or location information of the receive-end UE. For example, the receive-end UE obtains a GPS location of the transmit-end UE, an ID of a base station serving the transmit-end UE, a zone ID of a zone in which the transmit-end UE is located, transmit power, a GPS location of the receive-end UE, an ID of a base station serving the receive-end UE, and a zone ID of a zone in which the receive-end UE is located, to calculate the range between the two UEs; or the receive-end UE may measure the RSRP of the transmit-end UE, and calculate a path loss based on the transmit power of the transmit-end UE, to estimate the range. FIG. 5 is an example diagram of assignment of zone IDs. As shown in FIG. 5, each ID identifier corresponds to a zone ID of one zone. A range between every two adjacent IDs (for example, ID=1 and ID=2) in a horizontal direction is 100 meters, and a range between every two adjacent IDs (for example, ID=1 and ID=5) in a vertical direction is 50 meters. Herein, a range between two UEs may be calculated based on ID identifiers. For example, if UE 1 is located in a zone identified by ID=1, and UE 2 is located in a zone identified by ID=7, a range between the UE 1 and the UE 2 is 3*100+1*40=340 meters. It should be understood that the example in FIG. 5 is merely for ease of understanding by a person skilled in the art, and does not constitute a limitation on the protection scope of the embodiments of this application.

Receive-end UE may receive information about transmit-end UE, to calculate a range between the transmit-end UE and the receive-end UE. For example, the transmit-end UE sends the information about the transmit-end UE to the receive-end UE, where the information about the transmit-end UE includes one or more of the following information: location information (for example, GPS location information) of the transmit-end UE, an identifier (for example, a zone ID) of a zone in which the transmit-end UE is located, or power information (for example, transmit power) of the transmit-end UE. Correspondingly, the receive-end UE receives the information about the transmit-end UE. The transmit-end UE may directly or indirectly send the information about the transmit-end UE to the receive-end UE through an SL interface. For example, the transmit-end UE may send the information about the transmit-end UE to the receive-end UE by using a message such as a PC5-S/an RRC/an SIB/an SDAP/a PDCP/an RLC/a MAC/an SCI message that is on the SL interface. Optionally, after receiving the message sent by the transmit-end UE, the receive-end UE may choose to reply with a response message.

Alternatively, the transmit-end UE may first send the information about the transmit-end UE to a network device (for example, a base station, a cell, and a core network element), and then the network device sends the information about the transmit-end UE to the received-end UE. Optionally, the network device may send the information about the transmit-end UE to the receive-end UE by using a message such as a NAS/an RRC/an SIB/an SDAP/a PDCP/an RLC/a MAC/a DCI/a UCI message that is on a Uu interface. Optionally, the message sent by the network device may be a unicast/groupcast/broadcast message.

The information about the transmit-end UE may be periodically sent to the receive-end UE, or may be triggered based on an event (for example, after a GPS range of the receive-end UE is sent to the transmit-end UE or the network device last time, a change of the range exceeds a specific threshold, where the threshold may be configured by the network device, the transmit-end UE, or another UE, and this is not limited).

It should be understood that specific sent content in the information about the transmit-end UE is merely described as an example, may further include other proper content, and does not impose a limitation on a groupcast/broadcast message in the embodiments of this application.

For example, regardless of a case in which the network device performs sending to the receive-end UE or a case in which the transmit-end UE performs sending to the receive-end UE, the information about the transmit-end UE in the sent message may be explicitly indicated or implicitly indicated (where for example, a plurality of levels may be defined for RSRP of the transmit-end UE, and the levels respectively correspond to range with different identifiers; for example, RSRP 1 corresponds to a range whose identifier is 1, and RSRP 2 corresponds to a range whose identifier is 2, RSRP 3 corresponds to a range whose identifier is 3, and the like; the receive-end UE may learn of the range based on the RSRP of the transmit-end UE, to determine, by using a range threshold, whether to feed back a NACK message).

If the transmit-end UE does not limit a HARQ feedback manner during logical channel filtering or multiplexing, a configuration inconsistency of one data transmission may be caused. For example, the receive-end UE learns, by searching a first correspondence, that an ACK/a NACK may need to be fed back for some data (for example, an LCH 1, an LCG 1, or QoS 1) in a single transmission, and NACK only needs to be fed back for some data (for example, an LCH 2, an LCG 2, or QoS 2). In this case, a rule may be defined to resolve a problem of inconsistent feedback manners (where for example, some manners are feeding back an ACK/a NACK, and some manners are feeding back NACK only). For example, the receive-end UE may determine a HARQ feedback manner of this data transmission based on a feedback resource. For example, if there are a plurality of feedback resources, an ACK/a NACK is fed back for a transport block TB; and if there is only one feedback resource, NACK only is fed back for the TB. For another example, the receive-end UE may centrally calculate a manner of calculating the range between the transmit-end UE and the receive-end UE: If calculation based on a GPS is used for some data, and calculation based on a zone ID is used for some data, it may be specified that a location is uniformly calculated based on the GPS. For another example, the receive-end UE may unify a range threshold: If a range threshold of some data is 100 m, and a range threshold of some data is 50 m, a larger/smaller range threshold may be selected as a feedback threshold of this data transmission. For another example, the receive-end UE may uniformly determine whether HARQ feedback can be performed: For unicast/groupcast, if HARQ enabled/disabled information of some data is HARQ enabled, and HARQ enabled/disabled information of some data is HARQ disabled, the HARQ enabled/disabled information is unified to be HARQ enabled or HARQ disabled, or is set to HARQ enabled/disabled according to a specific rule.

The foregoing describes the embodiments of how the transmit-end UE and the receive-end UE determine the feedback manner type. The following provides descriptions from a perspective of configuration on a network device side. It should be understood that, for explanations of terms or concepts appearing in the embodiments of this application, reference may be made to each other, and this is not limited. It should be further understood that the embodiments of this application may be used in combination based on an internal logical relationship, or each of the embodiments may be used independently. This is not limited.

Figure 6:
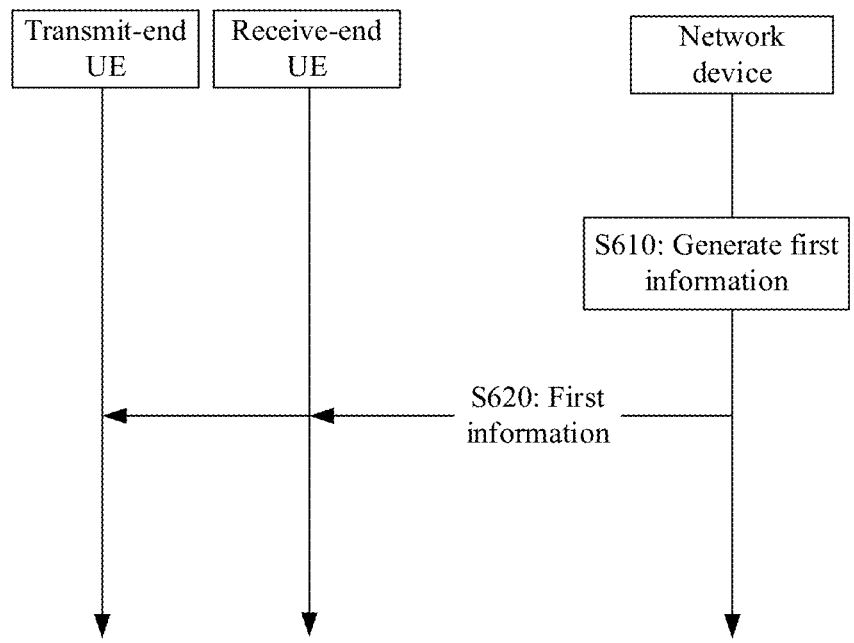
FIG. 6 is a schematic diagram of a HARQ feedback information transmission method according to still another embodiment of this application.

FIG. 6 is a schematic interaction diagram of a HARQ feedback information transmission method 600 according to still another embodiment of this application. As shown in FIG. 6, the method boo includes the following steps.

S610: A network device generates first information, where the first information is used by a terminal device to determine a feedback manner type.

For explanations of the feedback manner type, refer to the foregoing descriptions.

For brevity, details are not described herein.

The network device may be a gNB/a Cell/a CN/an MME/an AMF/a V2X CF/a GW/an RSU/an OAM/an APP server/a third-party network element, or the like.

S620: The network device sends the first information to transmit-end UE or receive-end UE.

It should be understood that, in this embodiment of this application, the first information may be configured by using higher layer signaling, for example, NAS (Uu only), pre-configured signaling (Uu only), PC5-S(SL only), RRC signaling (Uu & SL), SIB signaling (Uu & SL), SDAP (Uu & SL), PDCP (Uu & SL), RLC (Uu & SL), or MAC CE (Uu & SL). Optionally, a HARQ feedback configuration within a period of time may be configured, so that UE keeps applying the configuration until next reconfiguration/modification/releasing, or the like; or this configuration has lifetime (before a timer expires or before N transmissions end); or this configuration is applicable only to this data transmission.

Alternatively, the first information may be configured by using signaling (for example, DCI, UCI, or SCI) of an underlying layer such as a physical PHY layer. Optionally, in each data transmission, HARQ feedback configuration information of this data transmission is indicated; or a HARQ feedback configuration within a period of time or a periodicity is configured, so that UE keeps applying the configuration until next reconfiguration/modification/releasing, or the like.

Alternatively, configuration and/or (de)activation may be performed on the first information by using combined signaling. For example, the configuration and/or (de)activation is RRC configuration+MAC/DCI (de)activation. Specifically, for example, a status of the first information after the RRC configuration may be immediate application or no application. If the status is no application, subsequent MAC/DCI may be applied after the first information is applied. If the status is application, subsequent MAC/DCI deactivation may be disabled. Alternatively, a MAC CE or DCI is carried in each data transmission, and is used only for a HARQ feedback configuration of this data transmission.

Alternatively, the network device configures/activates signaling. Optionally, a configuration receiver may reply with a success, a failure, a rejection, or the like of this configuration. In a case of the failure or the rejection, for the Tx UE and the Rx UE, this configuration does not take effect; otherwise, this configuration takes effect.

Optionally, the network device may send the first information in any one or more manners of unicast/groupcast/broadcast. This is not limited.

Optionally, if the network device sends the first information to the transmit-end UE and also sends the first information to the receive-end UE, but the first information is not sent at the same time, the transmit-end UE and the receive-end UE may use a configuration of the network device, or negotiate a uniform configuration by themselves. This is not limited.

Optionally, intra-group UE (for example, head UE) may also send the first information to the transmit-end UE or the receive-end UE. For example, the intra-group UE sends the first information by using SL PC5-S/SIB/RRC/MAC/SCI signaling.

For example, if the first information sent by the network device to the transmit-end UE by using an SIB or an RRC message is {DEST/service ID=1, enabled}, for the DEST/service ID=1, the transmit-end UE uses an enabled manner for all corresponding unicast connections/groupcast groups (where DEST is a receive-end UE identifier or a service identifier in a unicast connection, a group identifier Group ID or a service identifier in groupcast, and a service identifier in broadcast); if the first information sent by the network device to the transmit-end UE by using an SIB is {CBR<Thr, enabled}, where Thr represents a threshold that the CBR needs to meet, the transmit-end UE determines, based on a CBR measurement value of the transmit-end UE, whether a condition (CBR<Thr) is met, and if the condition (CBR<Thr) is met, disabled is used for all services for the transmit-end UE and corresponding unicast connections or groupcast groups and/or LCHs; if the first information sent by the network device to the transmit-end UE by using an SIB is {CBR<Thr & unicast, enabled}, the transmit-end UE determines, based on a CBR measurement value of the transmit-end UE, whether a condition (CBR<Thr) is met, and if the condition (CBR<Thr) is met, unicast connections corresponding to all services for the transmit-end UE are disabled. Correspondingly, the transmit-end UE receives the first information, and applies the first information. For example, when sending a data packet, the transmit-end UE may determine a feedback manner type by using the first information. For example, if a transmission resource of the transmit-end UE carries a feedback manner type, the transmit-end UE obtains the feedback manner type of this transmission based on the first information.

Correspondingly, the receive-end UE receives the first information, and applies the first information. For example, when sending feedback information, the receive-end UE may determine the feedback manner type by using the first information. For example, if a transmission resource of the receive-end UE carries a feedback manner type, the receive-end UE obtains the feedback manner type of this transmission based on the first information.

Alternatively, after receiving the first information, the transmit-end UE may generate second information based on the first information, and send the second information to the receive-end UE, where the second information is used by the receive-end UE to determine the feedback manner type. Herein, for related descriptions of the second information, refer to the foregoing descriptions. For brevity, details are not described herein again. Optionally, the transmit-end UE may send the second information to the receive-end UE by using SL PC5-S/SIB/RRC/MAC/SCI signaling. Correspondingly, the receive-end UE receives the second information, and applies the second information. For example, when sending feedback information, the receive-end UE may determine the feedback manner type by using the second information. For example, if control signaling (for example, SCI) or data signaling received by the receive-end UE carries a feedback manner type, the receive-end UE obtains the feedback manner type of this transmission based on the second information.

For example, the network device may send the first information to the transmit-end UE or the receive-end UE by using one or more of the following: radio resource control RRC signaling, system information block SIB information, downlink control information DCI, or pre-configured signaling. Correspondingly, the transmit-end UE or the receive-end UE receives the first information sent by the network device by using one or more of the foregoing.

For example, the network device may configure a plurality of feedback manners by using RRC signaling or SIB information, and then indicate a feedback manner type to the transmit-end UE or the receive-end UE by using DCI.

For example, the network device may indicate a feedback manner type of a single transmission by using the first information. The feedback manner type of the single transmission may be a one-off transmission manner; or may be configured once, and periodically used subsequently.

For example, the network device may alternatively indicate a feedback manner type of a plurality of transmissions by using the first information.

For example, the network device may configure a stable relationship for UE (where after the configuration, the stable relationship is always used, or used until a timer expires/a number of transmission times reaches an upper limit N/reconfiguration is performed/the configuration is modified/the configuration is released), or may configure a HARQ feedback manner of a single transmission/a HARQ feedback manner of a TB.

Optionally, the first information includes a first correspondence. That the first information includes the first correspondence may be described as follows: The first information may include a first granularity and a feedback manner type, and there is a correspondence between the first granularity and the feedback manner type. For descriptions of the first granularity, refer to the foregoing descriptions. For brevity, details are not described herein again.

For example, the gNB configures the following feedback manners for the Tx/Rx UE by using SIB/RRC signaling, where the following feedback manners may be always effective after being configured:
 (a) {A DEST 1 corresponds to Group NACK only, a calculation manner priority is GPS>Zone>RSRP, and a range threshold is 100 m}
 For data corresponding to a sending destination DEST 1, feedback is performed only through NACK only. The range calculation priority is GPS>zone>RSRP. Rx UE whose range from the Tx UE is less than or equal to wo m needs to perform feedback. UE outside a range does not need to perform feedback regardless of whether reception succeeds.
 (b) {A DEST 2 corresponds to Group NACK only, a calculation manner is RSRP-based, and a range threshold is 10 dBm}
 For data corresponding to a sending destination DEST 2, feedback is performed only through NACK only, range calculation can be performed based only on SL RSRP, and the UE needs to perform feedback only when SL RSRP obtained by the receive-end UE by measuring the transmit-end UE is greater than or equal to 10 dBm. However, UE exceeding the range threshold does not need to perform feedback regardless of whether reception succeeds.
 (c) {groupcast, group ID 1 or group ID 2+Tx UE ID 2, ACK/NACK}
  i. In groupcast communication, for data corresponding to a sending destination group ID 1, feedback is performed only in an ACK/NACK manner.
  ii. In groupcast communication, for data corresponding to a sending destination group ID 2 and a source Tx UE ID 2, feedback is performed only in an ACK/NACK manner.
 (d) {unicast, QoS 1 or SL LCH 1 or SL RB 1, HARQ disabled}
 In all unicast communication, a gNB configures QoS 1/an SL LCH Van SL RB 1, and a HARQ feedback enabled/disabled information in a corresponding configuration is HARQ disabled.

It should be understood that the foregoing examples (a) to (d) are merely examples for description, and do not constitute a limitation on this embodiment of this application.

For example, the network device (for example, a V2X CF) performs the following configuration for the Tx/Rx UE by using pre-configured signaling, and the configuration may be always effective after being performed:
 (a) {The DEST 1 corresponds to Group NACK only, ACK/NACK}
 For the data corresponding to the sending destination DEST 1, feedback may be performed by using an ACK/a NACK, or feedback may be performed by using NACK only.
 (b) {group ID 1 or group ID 1+Tx UE ID 1 or QoS/LCH, disabled}
 For the data corresponding to the sending destination group ID 1, feedback does not need to be performed. For data that is sent by the Tx UE ID 1 and that corresponds to the sending destination Group ID 1, feedback does not need to be performed.

For example, the gNB configures, for the Tx/Rx UE by using DCI signaling, a HARQ feedback manner of a single data transmission. Specifically, the gNB indicates related information, in DCI of each Dynamic Grant (DG), or in RRC/DCI activation signaling of CG type 2 (Configured Grant type 2). The DCI of the DG is applicable to a grant scheduled in this transmission, and is also applicable to a plurality of grants scheduled in DCI in this transmission (if a plurality of DGs are allowed to be scheduled in one piece of DCI), and/or a plurality of repetitions and/or initial transmissions/retransmissions of one grant. Alternatively, the gNB may configure different HARQ feedback solutions for the foregoing cases. RRC/DCI of a CG is applicable to a CG (list) activated in this transmission, and the same configuration or a different configuration may be used for the CG (list) activated in this transmission. This is not limited.

Optionally, the method 600 further includes: The network device sends fourth information to the transmit-end UE or the receive-end UE, where the fourth information includes one or more of the following: a communication type, a range threshold, or a manner of calculating a range between the first terminal device and the second terminal device. Correspondingly, after receiving the fourth information, the transmit-end UE may send third information to the receive-end UE, so that when using a second HARQ feedback manner, the receive-end UE uses the third information to determine whether to send a NACK message. Alternatively, the receive-end UE may directly receive the fourth information sent by the network device, so that when using a second HARQ feedback manner, the receive-end UE uses the fourth information to determine whether to send a NACK message.

Optionally, the method 600 further includes: The network device sends a feedback policy to the transmit-end UE or the receive-end UE, where the feedback policy is a policy used to determine a feedback manner type.

Correspondingly, the transmit-end UE receives the feedback policy; and uses the feedback policy to determine, based on the first correspondence, a feedback manner type corresponding to a current transmission.

For example, the network device may know a status (such as a number of members, a load status, and a service delay) of the transmit-end UE, to explicitly configure a feedback policy for the transmit-end UE. For example, the network device may indicate the transmit-end UE to use which feedback manner type in which case. The transmit-end UE may directly obtain the feedback manner type based on the feedback policy. Alternatively, the network device may indirectly configure the feedback policy, so that the transmit-end UE determines the feedback manner type based on a status of the transmit-end UE by using the feedback policy.

Correspondingly, the receive-end UE receives the feedback policy; and uses the feedback policy to determine the feedback manner type used for performing feedback on the data packet.

For example, the network device may know a status (such as a number of members, a load status, and a service delay) of the receive-end UE, to explicitly configure a feedback policy for the receive-end UE. For example, the network device may indicate the receive-end UE to use which feedback manner type in which case. The receive-end UE may directly obtain a feedback manner type based on the feedback policy. Alternatively, the network device may indirectly configure the feedback policy, so that the receive-end UE determines a feedback manner type based on a status of the receive-end UE by using the feedback policy.

A status of UE (the transmit-end UE or the receive-end UE) may be one or more of the following: QoS information (such as a delay, reliability, a communication range, and a rate) of a service, a number of group members, or an SL channel status (such as SL CBR measurement, SL RSRP/CSI/CQI/PMI/RI/a path loss/an SINR between two UEs in unicast, and SL RSRP between a plurality of UEs in a groupcast group).

For example, the feedback policy means: When a number of group members of a terminal device (the transmit-end UE or the receive-end UE) meets a first threshold, the first HARQ feedback manner is used. Alternatively, when a number of group members of a terminal device meets a second threshold, the second HARQ feedback manner is used.

For example, when the number of group members meets a condition {for example, Number<Thr}, the UE performs feedback by using Group ACK/NACK. When the number of group members meets a condition (for example, Number ≥Thr), the UE performs feedback by using Group NACK only or HARQ disable. When a CBR of the Tx/Rx/Head UE meets a condition (for example, CBR>Thr), the UE performs feedback by using Group NACK only or HARQ disable. When a CBR of the Tx/Rx/Head UE meets a condition (for example, CBR<Thr), the UE performs feedback by using Group ACK/NACK.

For example, the network device may further configure a policy for selecting a range calculation manner in the HARQ NACK only feedback manner. For example, priorities corresponding to range calculation manners are sequentially reduced in the following sequence: calculating a range based on a GPS location, calculating a range based on a zone ID, and estimating a range based on SL RSRP. Optionally, the network device may further configure an application condition of each calculation manner. For example, when a zone range is greater than 100 meters, the manner of calculating a range based on a zone ID is invalid; and when RSRP is less than 10 dB, the manner of estimating a range based on RSRP is invalid.

Information used by the network device to generate the feedback policy is not limited in this embodiment of this application, and content in the first granularity may be used. It may be understood that, in addition to the first granularity described above, the network device may further configure the feedback policy by using other information. For example, the network device configures the feedback policy by using one or more of the following: a RAT (list) identifier; a carrier/frequency (list) identifier; a base station/cell (list) identifier; Tx/Rx information, for example, a UE identifier (for example, a UE IP/MAC/address, a UE ID (a UE SL L2 ID/address, a UE SL L1 ID/address, a C-RNTI, an IMSI, or a TMSI) (list)) (list); a QoS (for example, PPPP/PPPR/QFI/5QI/QoS Flow/VQI/PQI) (list) identifier; a communication type cast-type (for example, unicast, groupcast, or broadcast) (list) identifier; a communication mode SL mode (list) identifier (for example, a base station scheduling mode, a UE contention mode, an LTE SL mode 3, an LTE SL mode 4, an NR SL mode 1, or an NR SL mode 2); a service (ID) (list) identifier; a BWP (Bandwidth Part) (list) identifier; a logical channel group LCG (Logical Channel Group) (list) identifier; a logical channel LCH (Logical CHannel) (list) identifier; an SL RB (list) identifier; a connection identifier (for example, connection ID (list)); a group identifier (for example, group connection ID (list) or Group Uu/SL L2/L1 ID); a communication source SRC (Source Uu/SL ID, or L2/L1 ID) (list); a communication destination DEST (Destination Uu/SL ID, or L2/L1 ID) (list); a HARQ process identifier: one or more; a resource property: configured grant/SPS, or Dynamic Grant; or an initial transmission/a retransmission.

In this embodiment of this application, the UE (the transmit-end UE or the receive-end UE) determines that a manner used to determine a feedback manner type is selected by the UE, but is not controlled/configured by the gNB. Optionally, if the UE selects the manner used to determine a feedback manner type, the UE needs to notify the gNB of the latest manner used to determine a feedback manner type, so that when allocating a grant, the gNB can allocate, based on the latest manner used to determine a feedback manner type, different PSFCH resources (where for example, a plurality of ACKs/NACKs and one NACK are needed).

In this embodiment of this application, because a configuration layer (non-MAC/PHY layer) is different from an actual usage layer (MAC/PHY layer), after obtaining property information at the configuration layer, the terminal device needs to forward the property information to the corresponding usage layer, so that a mapping table between a corresponding granularity and HARQ feedback manner can be formed, to help the transmit-end UE or the receive-end UE use the property information to determine the feedback manner type. For example, a V2X layer/an RRC layer of the UE notifies the MAC layer of the following: {DEST/QoS/LCH/group ID+Tx, ACK/NACK or NACK}; the V2X layer/the RRC layer/a MAC layer of the UE notifies a PHY layer of the UE of the following: {groupcast+Tx L1 ID+Group L1 ID, ACK/NACK or NACK}.

In this embodiment of this application, the terminal device may exchange, between layers, the property information, that is, property information of this transmission. For descriptions of the property information, refer to the foregoing descriptions. For brevity, details are not described herein.

For the transmit-end UE, the MAC layer of the transmit-end UE may need to learn of the property information for the following reasons: For example, when performing LCP restriction, the MAC layer of the transmit-end UE needs to select, for a property corresponding to a grant, an appropriate DEST and/or LCH and appropriate data to perform data packet assembly; or the PHY layer of the transmit-end UE cannot directly obtain the property information, and the PHY layer of the transmit-end UE needs to rely on the MAC layer of the transmit-end UE to indicate the property information to the PHY layer.

For how the MAC layer of the transmit-end UE obtains the property information, the following method may be used: The MAC layer of the transmit-end UE may obtain the property information by receiving DCI sent by the network device and carried grant information; or the MAC layer of the transmit-end UE may determine the property information by itself.

For the transmit-end UE, the PHY layer of the transmit-end UE may need to learn of the property information for the following reasons: For example, the PHY layer of the transmit-end UE needs to determine, based on the property information, whether to receive an SL HARQ feedback; or for another example, the PHY layer of the transmit-end UE needs to determine, based on the property information, whether to feed back, in UL, an SL HARQ feedback result to a base station or a network; or for another example, the PHY layer of the transmit-end UE needs to determine, based on the property information, whether to receive an SL HARQ feedback in an ACK/NACK manner of groupcast communication or to receive an SL HARQ feedback in a NACK only manner of groupcast communication.

For how the PHY layer of the transmit-end UE obtains the property information, the PHY layer of the transmit-end UE may obtain the property information by using the DCI sent by the network device; or the PHY layer of the transmit-end UE may obtain the property information by querying a table; or the PHY layer of the transmit-end UE may determine the property information by using an indication of the MAC layer. For example, the MAC layer of the transmit-end UE can sense the property information, to indicate, by using an inter-layer primitive, the PHY layer of the transmit-end UE how to send the property information or how to receive feedback information. For example, the MAC layer of the transmit-end UE cannot sense the property information, but sends the property information to the PHY layer of the transmit-end UE, so that the PHY layer of the transmit-end UE determines how to send the property information or how to receive feedback information.

For the receive-end UE, the MAC layer of the receive-end UE may need to learn of the property information for the following reason: For example, if the PHY layer of the receive-end UE cannot directly obtain the property information, the MAC layer of the receive-end UE needs to indicate the property information to the PHY layer.

For the receive-end UE, the MAC layer of the receive-end UE may obtain the property information by receiving SCI sent by the transmit-end UE, or receive an RRC message (where the RRC message includes a plurality of feedback manner types) sent by the transmit-end UE, and then, query a table based on the first granularity described above, to obtain the property information. The MAC layer of the receive-end UE may send the property information to the PHY layer of the transmit-end UE by using an inter-layer primitive. For example, the MAC layer of the receive-end UE can sense the property information, for example, a feedback manner type, or HARQ enabled/disabled information, to indicate the PHY layer of the receive-end UE how to send feedback information. For example, the MAC layer of the receive-end UE cannot sense the property information, but sends the property information to the PHY layer of the UE, so that the PHY layer of the receive-end UE determines how to send feedback information.

For the receive-end UE, the PHY layer of the receive-end UE may need to learn of the property information for the following reasons: For example, the PHY layer of the receive-end UE needs to determine, based on the property information, whether to send an SL HARQ feedback; or for another example, the PHY layer of the receive-end UE needs to determine, based on the property information, whether to send an SL HARQ feedback in an ACK/NACK manner of groupcast communication or to send an SL HARQ feedback in a NACK only manner of groupcast communication; or for another example, the PHY layer of the receive-end UE needs to determine, based on the property information, location information of the transmit-end UE provided by the transmit-end UE, the range threshold, and location information of the receive-end UE, whether the range between the receive-end UE and the transmit-end UE is less than the range threshold, and determine, based on a determining result, whether to perform feedback (where for example, a NACK needs to be sent in the HARQ NACK only manner) or skip performing feedback.

Similarly, the PHY layer of the receive-end UE may obtain the property information by receiving SCI sent by the transmit-end UE, or receive an RRC message (where the RRC message includes a plurality of feedback manner types) sent by the transmit-end UE, and then, query a table based on the first granularity described above, to obtain the property information. Alternatively, the PHY layer of the receive-end UE may determine the property information by using an indication of the MAC layer.

For ease of understanding, the following describes behavior of the receive-end UE and the transmit-end UE with reference to different scenarios. It may be understood that the following descriptions are example descriptions, and do not constitute a limitation on the protection scope of the embodiments of this application. The following provides descriptions by using an example in which the network device is the gNB, the transmit-end UE is the Tx UE, and the receive-end UE is the Rx UE.

Figure 7:
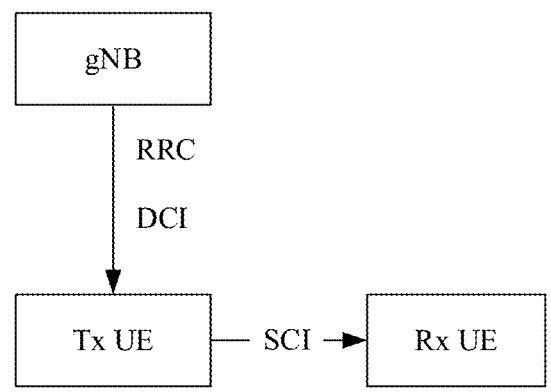
FIG. 7 is a schematic diagram of a scenario to which an embodiment of this application is applied.

Scenario 1: The Tx UE sends property information to the Rx UE by using SCI or a MAC CE. As shown in FIG. 7, the Tx UE receives a mapping relationship that is between a DEST/LCHs and property information and that is sent from the gNB by using an RRC message, and a grant that is sent from the gNB by using DCI. Then, the Tx UE may send the property information to the Rx UE by using the SCI and/or the MAC CE. For the Tx UE, the following describes how the PHY layer of the Tx UE obtains the property information in different manners.

Manner 1: The DCI sent by the gNB carries a DEST and the property information (where in this manner, the MAC layer of the Tx UE does not sense the property information). For the RRC layer, the gNB may not configure a binding relationship between a DEST and/ or an LCH and property information.

In the manner 1, impact on each protocol layer of the Tx UE is as follows: (1) At the MAC layer: Because the grant has explicitly indicated the DEST, when performing LCP restriction filtering, the Tx UE selects only data of LCHs that meet the corresponding property information and that are of the specified DEST, and performs MAC PDU data packet assembly (performs data packet assembly in descending order of priorities of the LCHs of the existing data). (2) The MAC layer indicates the property information to the PHY layer: The MAC layer of the Tx UE transfers, to the PHY layer, the grant sent by the gNB by using the DCI, or binds the grant to a HARQ process (where a MAC PDU of this transmission is also bound) and notifies the HARQ process to the PHY layer for sending, or the MAC layer indicates the property information to the PHY layer by using an inter-layer primitive. (3) At the PHY layer: The PHY layer of the Tx UE obtains the property information based on the grant explicitly transferred by the MAC layer, or obtains the property information based on the property information explicitly/implicitly transferred by the MAC layer in another manner (for example, a HARQ process). Optionally, the PHY layer of the Tx UE determines, based on the property information in the grant, property information carried in SCI (where a specific determining manner may be that the property information in the grant is directly copied to the SCI, or the property information in the grant is converted and then carried in the SCI).

Manner 2: The DCI sent by the gNB carries the property information.

In the manner 2, impact on each protocol layer of the Tx UE is as follows: (1) At the MAC layer: The MAC layer of the Tx UE only needs to perform DEST and/or LCH filtering based on the carried property information, select a DEST and LCHs that match the property information, then perform data packet assembly to obtain a MAC PDU, and indicate the PHY layer to send the MAC PDU. (2) For specific descriptions of an inter-layer primitive from the MAC layer to the PHY layer, refer to the descriptions in step (2) in the foregoing manner 1. For brevity, details are not described. (3) For specific descriptions of the PHY layer, refer to the descriptions in step (3) in the foregoing manner 1. For brevity, details are not described.

Manner 3: The DCI sent by the gNB does not carry the property information. For the RRC layer, the gNB needs to configure the binding relationship between a DEST and/or an LCH and property information. In the manner 3, impact on each protocol layer of the Tx UE is as follows: (1) At the MAC layer: Because a grant has no property information, it is implicitly expressed that the grant can be used by any DEST/LCHs. The MAC layer of the Tx UE first sorts DESTs (where a priority of an LCH that has data and a highest LCH priority is used as a priority of the DEST), then selects a DEST with a highest priority to perform this transmission, and sets property information of the grant to property information corresponding to the DEST and/ or selected LCHs. Alternatively, the MAC layer of the Tx UE may first set property information of the grant according to a specific rule, then perform LCP filtering, then select a DEST with a highest priority and LCHs of the DEST, to perform transmission, where the DEST and the LCHs meet the property information, and perform MAC PDU data packet assembly. (2) The MAC layer indicates property information to the PHY layer: Because the Tx UE has set a property for the grant at the MAC layer, the Tx UE may subsequently transfer the grant to the PHY layer, or bind the grant to a HARQ process and notifies the HARQ process to the PHY layer for sending; or the MAC layer indicates property information to the PHY layer by using an inter-layer primitive. (3) For specific descriptions of the PHY layer, refer to the descriptions in step (3) in the foregoing manner 1. For brevity, details are not described.

Correspondingly, the following describes, from a perspective of the Rx UE, how to obtain the property information in different manners. It may be understood that a manner 1, a manner 2, and a manner 3 described from the perspective of the Rx UE may not be associated with or may correspond to the manner 1, the manner 2, and the manner 3 described from the perspective of the Tx UE. This is not limited. It may be understood that, alternatively, a manner 1, a manner 2, and a manner 3 described from the perspective of the Rx UE may be associated with the manner 1, the manner 2, and the manner 3 described from the perspective of the Tx UE. Some descriptions may be used in combination or serve as reference. This is not limited.

Manner 1: The MAC layer of the Rx UE does not sense a property.

In the manner 1, because the MAC layer of the Rx UE does not sense the property, an inter-layer primitive from the MAC layer to the PHY layer of the Rx UE is always "indicating the PHY layer to perform feedback". At the PHY layer of the Rx UE: The PHY layer of the Rx UE reads SCI to obtain property information. All operations about the property information are performed at the PHY layer, specifically: (1) If the property information is HARQ enabled, the PHY layer of the Rx UE performs corresponding feedback based on an actual data transmission status. (2) If the property information is HARQ disabled, the PHY layer of the Rx UE does not perform feedback. (3) If the property information is HARQ NACK only, the PHY layer of the Rx UE performs feedback only when the property information is a NACK and a range between the Rx UE and the Tx UE is less than a threshold (where for example, the PHY layer of the Rx UE calculates the range based on a zone ID of the Tx UE carried in the SCI and a zone ID of the Rx UE, compares the range with the threshold, and if the range is less than the threshold, performs feedback). (4) If the property information is HARQ ACK/NACK, the PHY layer of the Rx UE performs corresponding feedback based on an actual data transmission status, and sends a HARQ ACK/NACK.

Manner 2: The MAC layer of the Rx UE completely senses property information (where the PHY layer does not sense a property).

In the manner 2, the MAC layer of the Rx UE may learn of the property information by reading SCI. The following describes how the MAC layer of the Rx UE indicates the PHY layer to perform feedback. For an inter-layer primitive from the MAC layer to the PHY layer: If the property information is HARQ enabled, the PHY layer is indicated to perform feedback. If the property information is HARQ disabled, the PHY layer is indicated to skip performing feedback or indicated to do nothing. If the property information is HARQ ACK/NACK, the PHY layer is indicated to perform ACK/NACK feedback. If the feedback information is HARQ NACK only, when the MAC layer of the Rx UE determines that a range between the Rx UE and the Tx UE is less than a threshold, the PHY layer is indicated to perform NACK only feedback.

In the manner 2, the PHY layer of the Rx UE reads the SCI, but does not obtain and sense the property. The PHY layer of the Rx UE performs feedback based completely on an indication of the MAC layer of the Rx UE.

Manner 3: The MAC layer of the Rx UE senses some property information. For example, the some property information is HARQ enabled/disabled, or the some property information is using which manner to determine the property information.

In the manner 3, for an inter-layer primitive from the MAC layer to the PHY layer of the Rx UE, if the property information is HARQ enabled, the PHY layer is indicated to perform feedback; if the property information is HARQ disabled, the PHY layer is indicated to skip performing feedback, or the PHY layer is not indicated to perform feedback.

In the manner 3, the PHY layer of the Rx UE senses some property information, such as options 1 and 2, and determines that a range is less than a threshold. If the property information is HARQ ACK/NACK, the PHY layer performs ACK/NACK feedback. If the property information is HARQ NACK only, the PHY layer performs NACK only feedback. If the property information is HARQ NACK only, the PHY layer of the Rx UE performs feedback only when determining that a range between the Rx UE and the Tx UE is less than a threshold.

Similarly, for the inter-layer primitive from the MAC layer to the PHY layer of the transmit-end UE, it is similar to the receive-end UE that there are also the foregoing three manners (the manner 1, the manner 2, and the manner 3). However, the MAC layer and the PHY layer of the transmit-end UE do not indicate whether the PHY layer performs feedback and/or how the PHY layer performs feedback, but indicate whether the PHY layer receives an SL HARQ feedback of the receive-end UE and/or how the PHY layer receives the SL HARQ feedback of the receive-end UE, and indicate whether the PHY layer performs feedback on a Uu interface and/or how the PHY layer performs feedback on the Uu interface.

In the foregoing scenario 1, because the Tx UE carries the property information in the SCI, the Rx UE only needs to read the property information in the SCI to determine how to perform ACK/NACK feedback. Certainly, as described above, for the Rx UE, the MAC layer of the Rx UE may sense the property information, or the PHY layer of the Rx UE may sense the property information, or both the MAC layer and the PHY layer of the Rx UE may sense the property information (for example, sense different parts).

Figure 8:
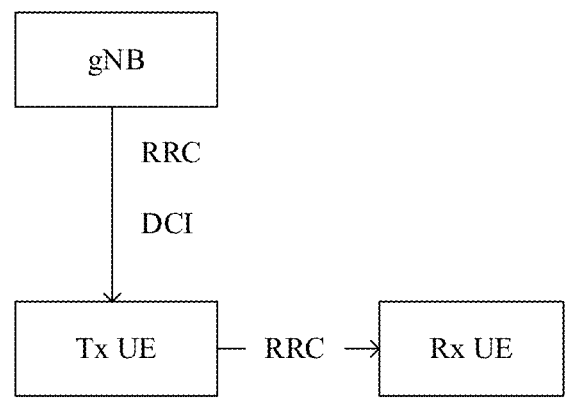
FIG. 8 is a schematic diagram of another scenario to which an embodiment of this application is applied.

Scenario 2: The Tx UE sends property information to the Rx UE by using an RRC message. As shown in FIG. 8, the Tx UE receives a mapping relationship that is between a DEST/LCHs and property information and that is sent from the gNB by using the RRC message, and a grant that is sent from the gNB by using DCI. Then, the Tx UE may send the property information to the Rx UE by using the RRC message. The property information includes HARQ feedback enabled/disabled information (for example, enabled/disabled), and a feedback manner type (for example, HARQ NACK only or HARQ ACK/NACK).

From a perspective of a side of the Tx UE, a difference from the scenario 1 is that SCI does not carry property information.

For a side of the Rx UE, because the SCI carries the property information in the scenario 1, after receiving the SCI, the Rx UE allocates an idle HARQ process ID for processing. The HARQ process ID is bound to HARQ information in the SCI (where for example, all information carried in the SCI, including the property information). Therefore, both the MAC layer and the PHY layer of the Rx UE may obtain, by using the HARQ information bound to the HARQ process ID, a HARQ feedback manner (namely, property information) corresponding to this transmission. However, in the scenario 2, because the SCI does not carry the property information, the MAC layer of the Rx UE can obtain configuration information of the Tx UE only from another layer (for example, a higher layer, specifically, for example, an SL RRC layer) of the Rx UE, to obtain an association relationship between a DEST/LCHs and the like and the property information. After obtaining the property information, another layer of the Rx UE notifies the MAC layer. After receiving the SCI (which does not carry the property information), the MAC layer of the Rx UE also allocates an idle HARQ process ID for processing, then reads DEST information carried in the SCI, obtains LCHs information carried in the MAC layer, queries a table based on the DEST information and the LCHs information (where for example, the Tx UE configures the table for the RRC layer of the Rx UE through SL RRC, and the RRC layer of the Rx UE notifies the table to the MAC layer of the Rx UE by using an inter-layer primitive, so that the MAC layer of the Rx UE obtains the table), to obtain a HARQ feedback manner (namely, property information) corresponding to a TB for this reception, and then binds the property information to the previously allocated HARQ process used to process this reception. Both the MAC layer and the PHY layer of the Rx UE may subsequently obtain, by using the HARQ information bound to the HARQ process ID, the HARQ feedback manner corresponding to this transmission. A subsequent procedure is the same as that in the scenario 1. For brevity, details are not described herein.

In the scenario 2, for the Rx UE, processing may also be performed in the three manners in the scenario 1. Manner 1: The MAC layer of the Rx UE does not sense a property. For specific descriptions, refer to the manner 1 in the scenario 1. For brevity, details are not described herein. Manner 2: The MAC layer of the Rx UE completely senses a property (where the PHY layer does not sense a property). For specific descriptions, refer to the manner 2 in the scenario 1. For brevity, details are not described herein. Manner 3: The MAC layer of the Rx UE senses some properties. For specific descriptions, refer to the manner 3 in the scenario 1. For brevity, details are not described herein.

A table query behavior of the Rx UE is described below with reference to examples.

For example, if an SRC ID corresponds to property information, the Rx UE may search for the corresponding property information based on the SRC ID. Alternatively, if (an SRC ID) & (an LCH ID) correspond to property information, the Rx UE may search for the corresponding property information by using the SRC ID and the LCH ID. Alternatively, if (an SRC ID) & (a DEST ID) correspond to property information, the Rx UE may search for the corresponding property information by using the SRC ID and the DEST ID. Alternatively, if (an SRC ID) & (a DEST ID) & (an LCH ID) corresponds to property information, the Rx UE may search for the corresponding property information by using the SRC ID, the DEST ID, and the LCH ID. For example, if (an SRC ID) & (a Grant/a HARQ ID) correspond to property information, the Rx UE may search for the corresponding property information based on (the SRC ID) & (the Grant/HARQ ID).

For example, if (a DEST ID) & (an LCH ID) correspond to property information, the Rx UE may search for the corresponding property information based on (the DEST ID) & (the LCH ID).

It may be understood that "table query" appearing above refers to searching a first correspondence by using a first granularity, to obtain a feedback manner type corresponding to the first granularity.

It should be understood that the solutions in the embodiments of this application may be properly combined for use, and explanations or descriptions of terms in the embodiments may be cross-referenced or explained in the embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of the embodiments of this application.

The foregoing describes in detail the HARQ feedback information transmission methods according to the embodiments of this application with reference to FIG. 1 to FIG. 8. The following describes communication apparatuses according to the embodiments of this application with reference to FIG. 9 to FIG. 1i. It should be understood that the technical features described in the method embodiments are also applicable to the following apparatus embodiments.

Figure 9:
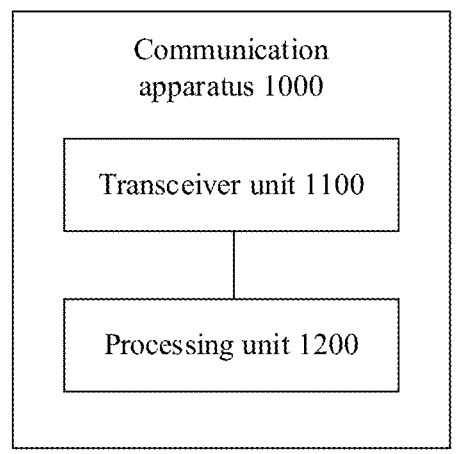
FIG. 9 is a schematic block diagram of a communication apparatus according to an embodiment of this application.

FIG. 9 is a schematic block diagram of a communication apparatus 1000 according to an embodiment of this application. As shown in FIG. 9, the communication apparatus 1000 may include a transceiver unit 1100 and a processing unit 1200.

In a possible design, the communication apparatus 1000 may correspond to a terminal device in the foregoing method embodiments. For example, the communication apparatus 1000 may be the terminal device, or may be a chip disposed in the terminal device.

Specifically, the communication apparatus 1000 may correspond to the terminal device in the method 300 or the method 500 according to the embodiments of this application. The communication apparatus 1000 may include units configured to perform the method performed by the terminal device in the method 300 in FIG. 3, or units configured to perform the method performed by the terminal device in the method 400 in FIG. 4, or units configured to perform the method performed by the terminal device in the method 600 in FIG. 6. In addition, the units in the communication apparatus 1000 and the foregoing other operations or functions are respectively intended to implement corresponding procedures of the terminal device in the method 300 in FIG. 3, or are respectively intended to implement corresponding procedures of the terminal device in the method 400 in FIG. 4, or are respectively intended to implement corresponding procedures of the terminal device in the method 600 in FIG. 6, or are respectively intended to implement corresponding procedures of the terminal device (the transmit-end UE or the receive-end UE) in FIG. 7, or are respectively intended to implement corresponding procedures of the terminal device (the transmit-end UE or the receive-end UE) in FIG. 8.

In an implementation, the transceiver unit 1100 and the processing unit 1200 may be respectively configured to perform the following steps.

The processing unit 1200 is configured to: determine, based on a first correspondence, a feedback manner type corresponding to a current transmission; and perform data packet assembly processing based on the feedback manner type. The transceiver unit 1100 is configured to send a data packet by using a transmission resource.

Optionally, the transceiver unit 1100 is configured to indicate a single feedback manner type to a second terminal device by using sidelink control information SCI.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

In a possible implementation, the processing unit 1200 is further configured to obtain a transmission resource, where the transmission resource carries property information, and the property information is used to indicate a HARQ feedback manner supported by the transmission resource. The processing unit 1200 is further configured to: sift out, from the first correspondence based on the property information, at least one logical channel whose HARQ feedback manner is the same as the HARQ feedback manner supported by the transmission resource; and send, on the transmission resource, data that is in the at least one logical channel.

In a possible implementation, the processing unit 1200 is further configured to: obtain a transmission resource, and if the transmission resource does not carry property information, invoke the transceiver unit 1100 to perform transmission, on the transmission resource, of data in a plurality of logical channels, where a feedback manner corresponding to each of the plurality of logical channels is the same or different.

In a possible implementation, the processing unit 1200 is further configured to: if the transmission resource does not carry property information, determine, for the transmission resource, a HARQ feedback manner supported by the transmission resource; sift out, from the first correspondence, at least one logical channel whose HARQ feedback manner is the same as the HARQ feedback manner supported by the transmission resource; and send, on the transmission resource, data that is in the at least one logical channel. Herein, the first terminal device may determine the property information for the transmission resource that does not carry the property information.

Optionally, that the processing unit 1200 is configured to determine, for the transmission resource, a HARQ feedback manner supported by the transmission resource includes: obtaining a destination address identifier with a highest priority, and using a HARQ feedback manner corresponding to the destination address identifier, as the HARQ feedback manner supported by the transmission resource.

In a possible implementation, the transceiver unit 1100 is further configured to send second information to the second terminal device, where the second information is used by the second terminal device to determine the feedback manner type.

Optionally, that the transceiver unit 1100 is configured to send second information to the second terminal device includes: sending the second information to the second terminal device by using one or more of the following: sidelink control information SCI, MAC signaling, sidelink signaling, RRC signaling, or SIB information.

Optionally, the second information includes one or more of the following information: a destination address identifier, a source identifier, a service type, a service identifier, a communication type, a logical channel identifier, a sidelink radio bearer, quality of service information, a transmission resource, a HARQ process identifier, a logical channel group identifier, or a transmit-end user equipment UE identifier.

Optionally, the second information indicates the feedback manner type of the single transmission.

Optionally, that the transceiver unit 1100 is configured to send second information to the second terminal device includes: sending a feedback manner type of a plurality of transmissions to the second terminal device, where the feedback manner type of the plurality of transmissions is included in the second information.

Optionally, the transceiver unit 1100 is further configured to: send third information to the second terminal device, where the third information includes one or more of the following information: a communication type, a range threshold, or a manner of calculating a range between the first terminal device and the second terminal device.

Optionally, the transceiver unit 1100 is further configured to: receive fourth information sent by a network device, where the fourth information includes: a communication type, a range threshold, or a manner of calculating a range between the first terminal device and a second terminal device.

Optionally, the transceiver unit 1100 is further configured to: send information about the first terminal device to the second terminal device or the network device, where the information about the first terminal device includes: location information of the first terminal device, an identifier of a zone in which the first terminal device is located, and power information of the first terminal device. In this way, the first terminal device may notify the second terminal device of the information related to the first terminal device, so that the second terminal device calculates the range.

Optionally, the processing unit 1200 is further configured to obtain the first correspondence. Optionally, the first correspondence may be predefined, or may be sent by another device to the first terminal device. This is not limited.

Optionally, that the processing unit 1200 is configured to obtain the first correspondence includes: invoking the transceiver unit 1100 to receive the first correspondence sent by a network device or a terminal device. The network device may be a base station or a core network control function.

Optionally, the transceiver unit 1100 is further configured to: receive a feedback policy sent by the network device, where the feedback policy is a policy used to determine a feedback manner type. That the processing unit 1200 is configured to determine, based on a first correspondence, a feedback manner type corresponding to a current transmission includes: determining, based on the first correspondence by using the feedback policy, the feedback manner type corresponding to the current transmission. Herein, the feedback policy may be an explicit feedback policy, that is, a feedback manner type is directly indicated. Alternatively, the feedback policy means that the terminal device needs to determine, according to the feedback policy and with reference to a status of the terminal device, a feedback manner type to be used.

In a possible implementation, that the processing unit 1200 determines, based on the first correspondence by using the feedback policy, the feedback manner type corresponding to the current transmission includes: determining, by using the feedback policy and based on the first correspondence and a status of the first terminal device, the feedback manner type corresponding to the current transmission. The status of the first terminal device may be information such as a number of group members, load, and a service delay.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

Alternatively, in an implementation, the transceiver unit 1100 and the processing unit 1200 may be respectively configured to perform the following steps.

The transceiver unit 1100 is configured to receive a data packet. The processing unit 1200 is configured to: determine a feedback manner type used for performing feedback on the data packet; and perform feedback by using the feedback manner type.

Optionally, the transceiver unit 1100 receives the feedback manner type that is of the single transmission and that is sent by using the SCI.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

In a possible implementation, the processing unit 1200 is further configured to obtain a first correspondence.

Optionally, that the processing unit 1200 is configured to obtain a first correspondence specifically includes: invoking the transceiver unit 1100 to receive the first correspondence sent by the network device or the first terminal device. Optionally, the first correspondence may be notified by another terminal device to the second terminal device, or may be generated by the second terminal device. This is not limited.

Optionally, the first correspondence includes a correspondence between a first granularity and a HARQ feedback manner, and the first granularity includes one or more of the following: a destination address identifier, a source address identifier, a service type, a service identifier, a transmission type, a logical channel identifier, a sidelink radio bearer, quality of service information, a transmission resource, a HARQ process identifier, a logical channel group identifier, a transmit-end user equipment UE identifier, or a receive-end UE identifier.

In a possible implementation, the transceiver unit 1100 is further configured to receive second information sent by the first terminal device, where the second information is used to determine the feedback manner type. That the processing unit 1200 is configured to determine a feedback manner type used for performing feedback on the data packet includes: determining, based on the second information, a feedback manner type corresponding to a current transmission. Herein, the second terminal device may determine, based on the second information, the feedback manner type corresponding to the current transmission.

Optionally, that the transceiver unit 1100 is configured to receive second information sent by the first terminal device includes: receiving the second information sent by the first terminal device by using one or more of the following: sidelink control information SCI, media access control MAC signaling, sidelink signaling, radio resource control RRC signaling, or system information block SIB information.

Optionally, the second information includes one or more of the following information: a destination address identifier, a source identifier, a service type, a service identifier, a communication type, a logical channel identifier, a sidelink radio bearer, quality of service information, a transmission resource, a HARQ process identifier, a logical channel group identifier, or a transmit-end user equipment UE identifier.

Optionally, the second information indicates the feedback manner type of the single transmission.

Optionally, that the transceiver unit 1100 is configured to receive second information sent by the first terminal device includes: receiving a feedback manner type of a plurality of transmissions that is sent by the first terminal device, where the feedback manner type of the plurality of transmissions is included in the second information. That the processing unit 1200 is configured to determine, based on the second information, a feedback manner type used for performing feedback on the data packet includes: determining, based on the second information and the first correspondence, the feedback manner type corresponding to the current transmission.

In a possible implementation, the transceiver unit 1100 is configured to receive first information sent by a network device, where the first information is used to determine a feedback manner type. That the processing unit 1200 is configured to determine a feedback manner type used for performing feedback on the data packet includes: determining, based on the first information, the feedback manner type corresponding to the current transmission. Herein, the second terminal device may directly receive the first information sent by the network device, to determine the feedback manner type based on the first information.

Optionally, that the transceiver unit 1100 is configured to receive first information sent by a network device includes: receiving the first information sent by the network device by using one or more of the following: downlink control information DCI, radio resource control RRC signaling, or system information block SIB information.

Optionally, the first information indicates the feedback manner type of the single transmission.

Optionally, that the transceiver unit 1100 is configured to receive first information sent by a network device includes: receiving a feedback manner type of a plurality of transmissions that is sent by the network device, where the feedback manner type of the plurality of transmissions is included in the first information. That the processing unit 1200 is configured to determine, based on the first information, a feedback manner type used for performing feedback on the data packet includes: determining, based on the first information and the first correspondence, the feedback manner type corresponding to the current transmission.

Optionally, that the processing unit 1200 is configured to perform feedback by using the feedback manner type includes: when the feedback manner type is the first HARQ feedback manner, sending an acknowledgement message or a non-acknowledgement message for the data packet; or when the feedback manner type is the second HARQ feedback manner, feeding back only a non-acknowledgement message for the data packet; or when the feedback manner type is the HARQ enabled/disabled information, if the HARQ enabled/disabled information indicates a terminal device to perform feedback, performing feedback for the data packet; or when the feedback manner type is the HARQ enabled/disabled information, if the HARQ enabled/disabled information indicates a terminal device to skip performing feedback, skipping performing feedback for the data packet.

In a possible implementation, if the feedback manner type is the second HARQ feedback manner, the processing unit 1200 is further configured to determine a range between the first terminal device and the second terminal device; and when the range meets a range threshold, determine that a non-acknowledgement message needs to be sent. Herein, the second terminal device may calculate the range, and send the non-acknowledgement message only when the range meets the range threshold. For example, the range between the first terminal device and the second terminal device is less than the range threshold.

Optionally, the transceiver unit 1100 is further configured to: receive third information sent from the first terminal device, where the third information includes one or more of the following information: a communication type, the range threshold, or a manner of calculating the range between the first terminal device and the second terminal device; or receive fourth information from the network device, where the fourth information includes one or more of the following information: a communication type, the range threshold, or a manner of calculating the range between the first terminal device and the second terminal device.

Optionally, that the processing unit 1200 is configured to determine a range between the first terminal device and the second terminal device includes: calculating the range based on one or more of the following information: a zone identifier, location information of the first terminal device, power information of the first terminal device, an identifier of the network device, an identifier of a zone in which the first terminal device is located, or location information of the second terminal device.

Optionally, the transceiver unit 1100 is further configured to receive information about the first terminal device, where the information about the first terminal device includes one or more of the following information: the location information of the first terminal device, the identifier of the zone in which the first terminal device is located, or the power information of the first terminal device.

Optionally, the transceiver unit 1100 is further configured to receive a feedback policy sent by the network device, where the feedback policy is a policy used to determine a feedback manner type. That the processing unit 1200 is configured to determine a feedback manner type used for performing feedback on the data packet includes: determining, by using the feedback policy, the feedback manner type used for performing feedback on the data packet.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

Alternatively, in an implementation, the transceiver unit 1100 and the processing unit 1200 may be respectively configured to perform the following steps.

The transceiver unit 1100 is configured to receive first information from a network device, where the first information is used by a terminal device to determine a feedback manner type. The processing unit 1200 is configured to apply the first information.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

In a possible implementation, that the processing unit 1200 is configured to apply the first information includes: when sending a data packet, determining, by the first terminal device, the feedback manner type based on the first information.

In a possible implementation, that the processing unit 1200 is configured to apply the first information includes: if a transmission resource carries the first information, and the first information indicates the feedback manner type, obtaining, by the first terminal device, a feedback manner type of this transmission based on the first information.

Optionally, that the transceiver unit 1100 is configured to receive first information from a network device includes: receiving the first information sent by the network device by using one or more of the following: radio resource control RRC signaling, or system information block SIB information, downlink control information DCI, or pre-configured signaling.

Optionally, the first information indicates a feedback manner type of a single transmission.

Optionally, the first information includes a feedback manner type of a plurality of transmissions.

Optionally, the first information includes a first correspondence.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

In a possible implementation, the processing unit 1200 is further configured to generate second information based on the first information, where the second information is used by the second terminal device to determine the feedback manner type. The transceiver unit 1100 is further configured to send the second information to the second terminal device.

Optionally, that the transceiver unit 1100 is configured to send the second information to the second terminal device includes sending the second information to the second terminal device by using any one of the following: sidelink control information SCI, media access control MAC signaling, radio resource control RRC signaling, or system information block SIB information.

Optionally, the second information indicates the feedback manner type of the single transmission.

Optionally, that the transceiver unit 1100 is configured to send the second information to the second terminal device includes: sending a feedback manner type of a plurality of transmissions to the second terminal device, where the feedback manner type of the plurality of transmissions is included in the second information.

In a possible implementation, the transceiver unit 1100 is further configured to receive fourth information from the network device, where the fourth information includes one or more of the following: a communication type, the range threshold, or a manner of calculating a range between the first terminal device and the second terminal device.

Optionally, the transceiver unit 1100 is further configured to send third information to the second terminal device, where the third information includes one or more of the following: a communication type, a range threshold, or a manner of calculating a range between the first terminal device and the second terminal device.

Alternatively, in an implementation, the transceiver unit 1100 and the processing unit 1200 may be respectively configured to perform the following steps.

The processing unit 1200 is configured to: invoke the transceiver unit 1100 to receive first information from a network device, where the first information is used by a terminal device to determine a feedback manner type, and determine the feedback manner type by applying the first information; or invoke the transceiver unit 1100 to receive second information from a first terminal device, where the second information is used by the second terminal device to determine a feedback manner type, and apply the second information.

In a possible implementation, that the processing unit 1200 is configured to apply the first information includes: when a data packet is sent, determining the feedback manner type based on the first information; or if a transmission resource carries the first information, and the first information indicates the feedback manner type, obtaining a feedback manner type of this transmission based on the first information.

In a possible implementation, that the processing unit 1200 is configured to apply the second information includes: when a data packet is sent, determining the feedback manner type based on the second information; or if a transmission resource carries the second information, and the second information indicates the feedback manner type, obtaining a feedback manner type of this transmission based on the second information.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

Optionally, that the transceiver unit 1100 is configured to receive first information from a network device includes: receiving the first information sent by the network device by using one or more of the following: radio resource control RRC signaling, or system information block SIB information, downlink control information DCI, or pre-configured signaling.

Optionally, the first information indicates a feedback manner type of a single transmission.

Optionally, the first information includes a feedback manner type of a plurality of transmissions.

Optionally, the first information includes a first correspondence.

Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

Optionally, that the transceiver unit 1100 is configured to receive second information from the first terminal device includes: receiving the second information sent by the first terminal device by using any one of the following: sidelink control information SCI, media access control MAC signaling, radio resource control RRC signaling, or system information block SIB information.

Optionally, the second information indicates the feedback manner type of the single transmission.

Optionally, that the transceiver unit 1100 is configured to receive second information from the first terminal device includes: receiving a feedback manner type of a plurality of transmissions from the first terminal device, where the feedback manner type of the plurality of transmissions is included in the second information.

It should be understood that a specific process in which the units perform the foregoing corresponding steps is described in detail in the foregoing method embodiments, and for brevity, details are not described herein.

Figure 10:
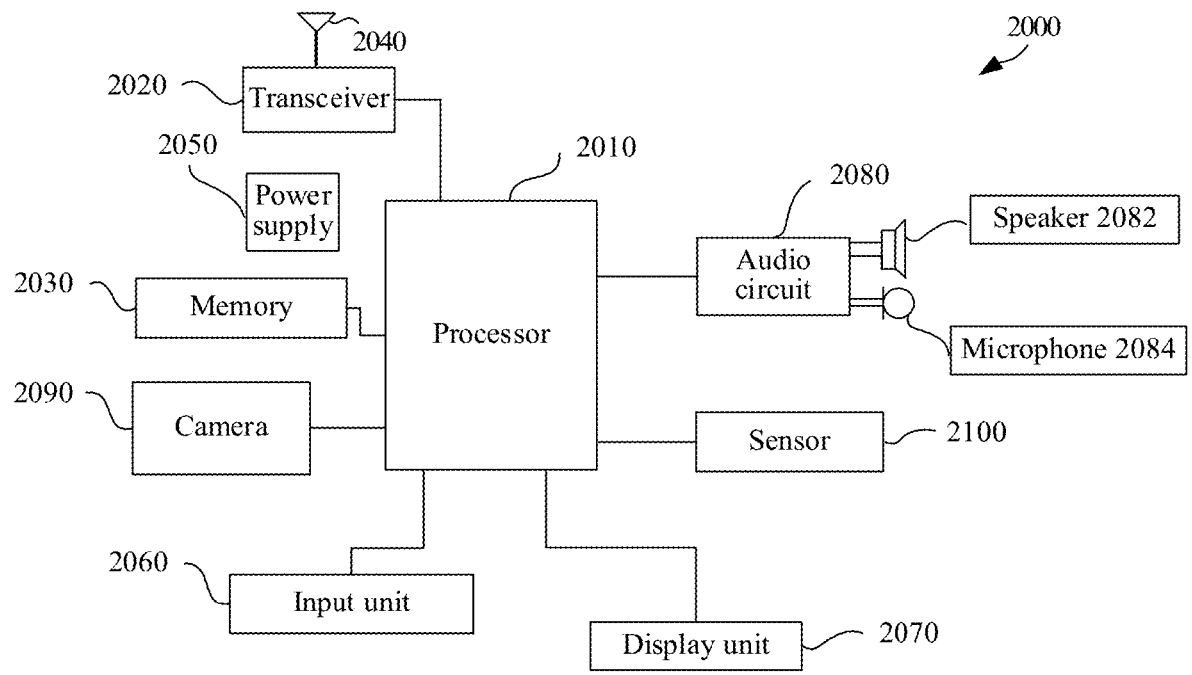
FIG. 10 is a schematic diagram of a structure of a terminal device according to an embodiment of this application.

It should be further understood that, when the communication apparatus 1000 is the terminal device, the transceiver unit 1100 in the communication apparatus 1000 may correspond to a transceiver 2020 in a terminal device 2000 shown in FIG. 10, and the processing unit 1200 in the communication apparatus 1000 may correspond to a processor 2010 in the terminal device 2000 shown in FIG. 10.

It should be further understood that, when the communication apparatus 1000 is the chip disposed in the terminal device, the transceiver unit 1100 in the communication apparatus 1000 may be an input/output interface.

In another possible design, the communication apparatus 1000 may correspond to the network device in the foregoing method embodiments. For example, the communication apparatus 1000 may be the network device, or may be a chip disposed in the network device.

Specifically, the communication apparatus 1000 may correspond to the network device in the method 600 according to the embodiments of this application. The communication apparatus 1000 may include units configured to perform the method performed by the network device in the method 600 in FIG. 6, or units configured to perform the method performed by the network device in the method in FIG. 7, or units configured to perform the method performed by the network device in the method in FIG. 8. In addition, the units in the communication apparatus 1000 and the foregoing other operations or functions are respectively intended to implement corresponding procedures of the network device in the method 600 in FIG. 6, or are respectively intended to implement corresponding procedures of the network device in FIG. 7, or are respectively intended to implement corresponding procedures of the network device in FIG. 8.

In an implementation, the transceiver unit 1100 and the processing unit 1200 may be respectively configured to perform the following steps.

The processing unit 1200 is configured to generate first information, where the first information is used by a terminal device to determine a feedback manner type. The transceiver unit 1100 is configured to send the first information to a first terminal device or a second terminal device. Herein, the network device may dynamically configure the feedback manner type for the terminal device.

Optionally, the feedback manner type includes a first HARQ feedback manner or a second HARQ feedback manner, where the first HARQ feedback manner means that a terminal device feeds back an acknowledgement message or a non-acknowledgement message, and the second HARQ feedback manner means that a terminal device feeds back only a non-acknowledgement message.

In a possible implementation, that the transceiver unit 1100 is configured to send the first information to a first terminal device or a second terminal device includes: sending the first information to the first terminal device or the second terminal device by using one or more of the following: radio resource control RRC signaling, system information block SIB information, downlink control information DCI, or pre-configured signaling. Herein, the network device may indicate the feedback manner type by using one piece of information or signaling; or may configure a plurality of feedback manner types by using one piece of information or signaling, and then indicate the feedback manner type by using another piece of information or signaling, for example, perform configuration by using RRC and perform indication by using the DCI. Optionally, the network device may be a core network control function or a base station.

Optionally, the first information indicates a feedback manner type of a single transmission.

Optionally, the first information includes a feedback manner type of a plurality of transmissions.

Optionally, the first information includes a first correspondence. Optionally, the first correspondence includes a correspondence between a first granularity and a HARQ feedback manner, and the first granularity includes one or more of the following: a destination address identifier, a source address identifier, a service type, a service identifier, a communication type, a logical channel identifier, a sidelink radio bearer, quality of service information, a transmission resource, a HARQ process identifier, a logical channel group identifier, a transmit-end user equipment UE identifier, or a receive-end UE identifier.

Optionally, the transceiver unit 1100 is further configured to send fourth information to the first terminal device or the second terminal device, where the fourth information includes one or more of the following: a communication type, a range threshold, or a manner of calculating a range between the first terminal device and the second terminal device.

Optionally, the transceiver unit 1100 is further configured to send a feedback policy to the first terminal device or the second terminal device, where the feedback policy is a policy used to determine a feedback manner type.

Optionally, the feedback policy means: When a number of group members of a terminal device meets a first threshold, the first HARQ feedback manner is used. Alternatively, when a number of group members of a terminal device meets a second threshold, the second HARQ feedback manner is used.

Figure 11:
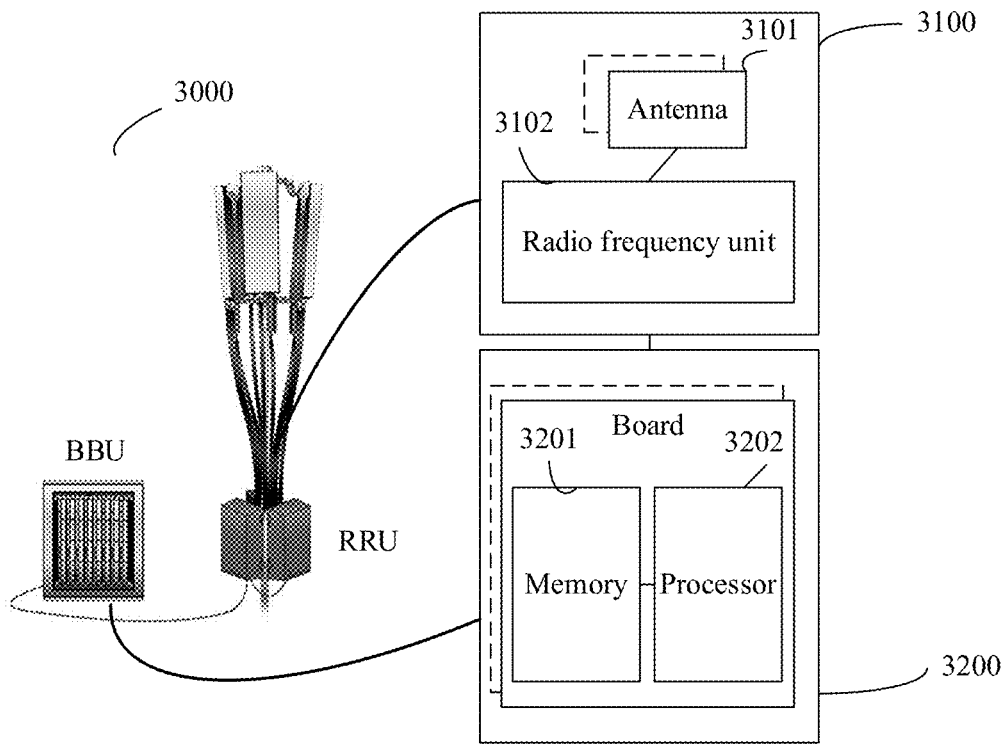
FIG. 11 is a schematic diagram of a structure of a network device according to an embodiment of this application.

It should be further understood that, when the communication apparatus 1000 is the network device, the transceiver unit 1100 in the communication apparatus 1000 may correspond to a transceiver unit 3100 in a network device 3000 shown in FIG. 1*i*, and the processing unit 1200 in the communication apparatus 1000 may correspond to a processing unit 3200 in the network device 3000 shown in FIG. 11.

It should be further understood that, when the communication apparatus 1000 is the chip disposed in the network device, the transceiver unit 1100 in the communication apparatus 1000 may be an input/output interface.

FIG. 10 is a schematic diagram of a structure of a terminal device 2000 according to an embodiment of this application. The terminal device 2000 may be used in the system shown in FIG. 1, to perform a function of the terminal device in the foregoing method embodiments. As shown in FIG. 10, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal and/or a data signal. The memory 2030 is configured to store a computer program. The processor 2010 is configured to invoke and run the computer program in the memory 2030, to control the transceiver 2020 to receive or send a signal. Optionally, the terminal device 2000 may further include an antenna 2040, configured to send, through a radio signal, uplink data or uplink control signaling that is output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 9.

The transceiver 2020 may correspond to the communication unit in FIG. 9, and may also be referred to as a transceiver unit. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 2000 shown in FIG. 10 can implement the processes of the terminal device in the method embodiment shown in FIG. 3, FIG. 5, or FIG. 8. Operations or functions of modules in the terminal device 2000 are respectively intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of sending to a network device or receiving from a network device that is performed by the terminal device and that is described in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to make functions of the terminal device more perfect, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 11 is a schematic diagram of a structure of a network device according to an embodiment of this application, for example, may be a schematic diagram of a structure of a base station 3000. The base station 3000 may be used in the system shown in FIG. 1 or FIG. 2, to perform a function of the network device in the foregoing method embodiments. As shown in the figure, the base station 3000 may include one or more radio frequency units, for example, one or more remote radio units (RRUs) 3100, and one or more baseband units (BBUs) (which may also be referred to as distributed units (DUs)) 3200. The RRU 3100 may be referred to as a transceiver unit or a communication unit, and corresponds to the transceiver unit 1100 in FIG. 9. Optionally, the transceiver unit 3100 may also be referred to as a transceiver machine, a transceiver circuit, a transceiver, or the like, and may include at least one antenna 3101 and a radio frequency unit 3102. Optionally, the transceiver unit 3100 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The RRU 3100 is mainly configured to receive and send radio frequency signals and perform conversion between a radio frequency signal and a baseband signal. The BBU 3200 is mainly configured to: perform baseband processing, control the base station, and so on. The RRU 3100 and the BBU 3200 may be physically disposed together. Alternatively, the RRU 3100 and the BBU 3200 may be physically disposed separately, that is, the base station is a distributed base station.

The BBU 3200 is a control center of the base station, or may be referred to as a processing unit. The BBU 3200 may correspond to the processing unit 1200 in FIG. 9, and is mainly configured to implement a baseband processing function, for example, channel coding, multiplexing, modulation, or spreading. For example, the BBU (the processing unit) may be configured to control the base station to perform an operation procedure related to the network device in the foregoing method embodiments, for example, to generate configuration information for CSI reporting.

In an example, the BBU 3200 may include one or more boards, and a plurality of boards may jointly support a radio access network (such as an LTE network) having a single access standard, or may respectively support radio access networks (such as an LTE network, a 5G network, or another network) having different access standards. The BBU 3200 further includes a memory 3201 and a processor 3202. The memory 3201 is configured to store necessary instructions and data. The processor 3202 is configured to control the base station to perform a necessary action, for example, is configured to control the base station to perform an operation procedure related to the network device in the foregoing method embodiments. The memory 3201 and the processor 3202 may serve one or more boards. In other words, the memory and the processor may be disposed on each board. Alternatively, a plurality of boards may share a same memory and a same processor. In addition, a necessary circuit may be further disposed on each board.

It should be understood that the base station 3000 shown in FIG. 11 can implement processes related to the network device in the foregoing method embodiments. Operations or functions of modules in the base station 3000 are respectively intended to implement corresponding procedures in the foregoing method embodiments. For details, refer to the descriptions in the foregoing method embodiments. To avoid repetition, detailed descriptions are properly omitted herein.

The BBU 3200 may be configured to perform an action that is implemented inside the network device and that is described in the foregoing method embodiments, and the RRU 3100 may be configured to perform an action of sending to the terminal device or receiving from the terminal device that is performed by the network device and that is described in the foregoing method embodiments. For details, refer to the descriptions in the foregoing method embodiments. Details are not described herein again.

According to the methods provided in the embodiments of this application, this application further provides a computer program product. The computer program product includes computer program code. When the computer program code is run on a computer, the computer is enabled to perform a method on a side of the terminal device in the embodiments shown in FIG. 3, FIG. 4, and FIG. 6.

According to the methods provided in the embodiments of this application, this application further provides a computer-readable medium. The computer-readable medium stores program code. When the program code is run on a computer, the computer is enabled to perform a method on a side of the network device in the embodiments shown FIG. 4, FIG. 7, and FIG. 8.

According to the methods provided in the embodiments of this application, this application further provides a system. The system includes the foregoing one or more terminal devices and the foregoing one or more network devices.

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a field programmable gate array (FPGA), or may be a general-purpose processor, a digital signal processor (DSP), an application-specific integrated circuit (ASIC), a field programmable gate array (FPGA) or another programmable logic device, a discrete gate or transistor logic device, or a discrete hardware component, may be a system on chip (SoC), may be a central processing unit (CPU), may be a network processor (NP), may be a digital signal processor (DSP), may be a micro controller unit (MCU), or may be a programmable logic device (PLD) or another integrated chip. The processing apparatus may implement or perform the methods, steps, and logical block diagrams that are disclosed in the embodiments of this application. The general-purpose processor may be a microprocessor, or the processor may be any conventional processor, or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

It may be understood that the memory in the embodiments of this application may be a volatile memory or a non-volatile memory, or may include both a volatile memory and a non-volatile memory. The non-volatile memory may be a read-only memory (ROM), a programmable ROM (PROM), an erasable PROM (EPROM), an electrically erasable programmable read-only memory (EEPROM), or a flash memory. The volatile memory may be a random access memory (RAM) that is used as an external cache. By way of example but not limitative descriptions, many forms of RAMs may be used, for example, a static RAM (SRAM), a dynamic (DRAM), a synchronous DRAM (SDRAM), a double data rate SDRAM (DDR SDRAM), an enhanced SDRAM (ESDRAM), a synchronous link DRAM (synchlink DRAM or SLDRAM), and a direct rambus RAM (DR RAM). It should be noted that the memories of the systems and methods described in this specification are intended to include but are not limited to these memories and a memory of any other proper type.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the terminal device or network device in the method embodiments. A corresponding module or unit performs a corresponding step. For example, a communication unit (a transceiver) performs a sending or receiving step in the method embodiments, and a processing unit (a processor) performs another step other than the sending or receiving step. For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that is run on a processor, the processor, an object, an executable file, a thread of execution, a program, or a computer. As illustrated by using the figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may communicate by using a local or remote process, for example, based on a signal having one or more data packets (for example, data from two components interacting with another component in a local system, a distributed system, or across a network such as the internet interacting with another system by using the signal).

It should be understood that "an embodiment" mentioned in the entire specification particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any appropriate manner.

It should be understood that, in the embodiments of this application, numbers "first", "second", and the like are merely used to distinguish between different objects, for example, to distinguish between different network devices, and do not constitute a limitation on the scope of the embodiments of this application. The embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in the embodiments of this application, "B corresponding to A" indicates that B is associated with A, and B may be determined based on A. However, it should further be understood that determining B based on A does not mean that B is determined based on only A. B may also be alternatively determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all operations in the embodiments of this application may be performed.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed systems, apparatuses, and methods may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, a displayed or discussed mutual coupling or direct coupling or communication connection may be implemented through some interfaces. An indirect coupling or communication connection between apparatuses or units may be implemented in an electronic, a mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk drive, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   determining, by a first terminal device, based on a first correspondence, a feedback manner type corresponding to a current transmission,
   wherein the first correspondence comprises a correspondence between a first granularity and a hybrid automatic repeat request (HARQ) feedback manner, wherein the first granularity comprises at least one of: a destination address identifier for unicast, a source address identifier, a service type, a service identifier, a communication type, a logical channel identifier, a sidelink radio bearer, a HARQ process identifier, a logical channel group identifier, a transmit-end user equipment (UE) identifier, or a receive-end UE identifier, and wherein the feedback manner type comprises HARQ enabled/disabled information, and the HARQ enabled/disabled information is used to indicate whether to perform feedback;
   obtaining, by the first terminal device, a transmission resource;
   when the transmission resource does not carry property information:
      obtaining, by the first terminal device, the destination address identifier with a highest priority, and
      using a HARQ feedback manner corresponding to the destination address identifier, as a HARQ feedback manner supported by the transmission resource;
   determining, by the first terminal device, from the first correspondence, at least one logical channel whose HARQ feedback manner is the same as the HARQ feedback manner supported by the transmission resource;
   performing, by the first terminal device, data packet assembly processing based on the feedback manner type; and
   sending, by the first terminal device, a data packet by using the transmission resource in the at least one logical channel.

2. The method according to claim 1, wherein the first granularity further comprises at least one of: quality of service information or the transmission resource.

3. The method according to claim 1, wherein the method further comprises:
   obtaining, by the first terminal device, a second transmission resource, wherein the second transmission resource carries property information, and wherein the property information indicates a second HARQ feedback manner supported by the second transmission resource;
   determining, by the first terminal device, from the first correspondence based on the property information, second at least one logical channel whose HARQ feedback manner is the same as the second HARQ feedback manner supported by the second transmission resource; and
   sending, by the first terminal device, on the second transmission resource, a second data packet in the second at least one logical channel.

4. The method according to claim 1, wherein the method further comprises:
   sending, by the first terminal device, second information to a second terminal device, wherein the second information is used by the second terminal device to determine the feedback manner type.

5. The method according to claim 4, wherein the second information comprises at least one of: the destination address identifier, a source identifier, the service type, the service identifier, the communication type, the logical channel identifier, the sidelink radio bearer, quality of service information, the transmission resource, the HARQ process identifier, the logical channel group identifier, the transmit-end UE identifier, or the receive-end UE identifier.

6. The method according to claim 1, wherein the method further comprises:
   sending, by the first terminal device, third information to a second terminal device, wherein the third information comprises one or more of: the communication type, a range threshold, or a manner of calculating a range between the first terminal device and the second terminal device.

7. The method according to claim 1, wherein the method further comprises:
   receiving, by the first terminal device, the first correspondence from a network device or from another terminal device.

8. The method according to claim 1, wherein the method further comprises:
   when a HARQ feedback is required after the first terminal device sends the data packet by using the transmission resource, receiving, by the first terminal device, a corresponding feedback result on a corresponding feedback time-frequency resource.

9. The method of claim 1, wherein the current transmission is a unicast transmission.

10. A method comprising:
    obtaining, by a terminal device, a transmission resource;
    when the transmission resource does not carry property information:
       obtaining, by the terminal device, a destination address identifier with a highest priority, and
       using a hybrid automatic repeat request (HARQ) feedback manner corresponding to the destination address identifier, as a used HARQ feedback manner supported by the transmission resource;
    when a number of group members of a group to which the terminal device belongs meets a preset condition, determining, by the terminal device, that the used HARQ feedback manner is a group negative acknowledgement (NACK) only;
    selecting, by the terminal device, at least one logical channel whose HARQ feedback manner is the same as the used HARQ feedback manner supported by the transmission resource; and
    sending, by the terminal device, a data packet by using the transmission resource in the at least one logical channel.

11. The method according to claim 10, wherein the preset condition comprises: the number of group members being greater than a preset threshold.

12. The method according to claim 10, wherein the terminal device determines the used HARQ feedback manner.

13. A communication device, comprising:
    one or more processors; and
    a non-transitory memory coupled to the one or more processors, wherein the non-transitory memory stores a program to be executed by the one or more processors, the program including instructions that cause the communication device to perform operations including:
       obtaining a transmission resource;
       when the transmission resource does not carry property information:

obtaining a destination address identifier with a highest priority, and using a hybrid automatic repeat request (HARQ) feedback manner corresponding to the destination address identifier, as a used HARQ feedback manner supported by the transmission resource;

when a number of group members of a group to which the communication device belongs meets a preset condition, determining that the used HARQ feedback manner is a group negative acknowledgement (NACK) only;

selecting at least one logical channel whose HARQ feedback manner is the same as the used HARQ feedback manner supported by the transmission resource; and sending a data packet by using the transmission resource in the at least one logical channel.

14. The communication device according to claim 13, wherein the preset condition comprises: the number of group members being greater than a preset threshold.

15. The communication device according to claim 13, wherein the communication device determines the used HARQ feedback manner.

16. A communication device, comprising:

one or more processors; and a non-transitory memory coupled to the one or more processors, wherein the non-transitory memory stores a program to be executed by the one or more processors, the program including instructions that cause the communication device to perform operations including:

determining based on a first correspondence, a feedback manner type corresponding to a current transmission, wherein the first correspondence comprises a correspondence between a first granularity and a hybrid automatic repeat request (HARQ) feedback manner, wherein the first granularity comprises at least one of: a destination address identifier for unicast, a source address identifier, a service type, a service identifier, a communication type, a logical channel identifier, a sidelink radio bearer, a HARQ process identifier, a logical channel group identifier, a transmit-end user equipment (UE) identifier, or a receive-end UE identifier, and wherein the feedback manner type comprises HARQ enabled/disabled information, and the HARQ enabled/disabled information is used to indicate whether to perform feedback;

obtaining a transmission resource;

when the transmission resource does not carry property information:

obtaining the destination address identifier with a highest priority, and using a HARQ feedback manner corresponding to the destination address identifier, as a HARQ feedback manner supported by the transmission resource;

determining from the first correspondence, at least one logical channel whose HARQ feedback manner is the same as the HARQ feedback manner supported by the transmission resource;

performing data packet assembly processing based on the feedback manner type; and sending a data packet by using the transmission resource in the at least one logical channel.

17. The communication device according to claim 16, wherein the first granularity further comprises at least one of: quality of service information or the transmission resource.

18. The communication device according to claim 16, the operations further comprising:

obtaining a second transmission resource, wherein the second transmission resource carries property information, and wherein the property information indicates a second HARQ feedback manner supported by the second transmission resource;

determining from the first correspondence based on the property information, second at least one logical channel whose HARQ feedback manner is the same as the second HARQ feedback manner supported by the second transmission resource; and sending on the second transmission resource, a second data packet in the second at least one logical channel.

* * * * *